(12) United States Patent
Benard et al.

(10) Patent No.: US 9,865,367 B2
(45) Date of Patent: Jan. 9, 2018

(54) PROCESS AND APPARATUS FOR SEPARATION OF TECHNETIUM-99M FROM MOLYBDATE

(71) Applicant: The Governers of The University of Alberta, The University of British Columbia, Carleton University, Simon Fraser University, The Governing Council of The University of Toronto and The University of Victoria, collectively carrying on business as TRIUMF, Vancouver (CA)

(72) Inventors: Francois Benard, Vancouver (CA); Kuo-Shyan Lin, Surrey (CA); Stefan Zeisler, Vancouver (CA); Milan Vuckovic, Vancouver (CA); Paul Schaffer, Richmond (CA)

(73) Assignee: TRIUMF, A Joint Venture, Vancouver (CA)

(*) Notice: Subject to any disclaimer, the term of this patent is extended or adjusted under 35 U.S.C. 154(b) by 169 days.

(21) Appl. No.: 14/654,363

(22) PCT Filed: Dec. 20, 2013

(86) PCT No.: PCT/IB2013/061234
§ 371 (c)(1),
(2) Date: Jun. 19, 2015

(87) PCT Pub. No.: WO2014/097269
PCT Pub. Date: Jun. 26, 2014

(65) Prior Publication Data
US 2015/0348662 A1 Dec. 3, 2015

Related U.S. Application Data

(60) Provisional application No. 61/745,379, filed on Dec. 21, 2012.

(51) Int. Cl.
C22B 61/00 (2006.01)
C08J 3/24 (2006.01)
G21G 1/00 (2006.01)

(52) U.S. Cl.
CPC ............. *G21G 1/001* (2013.01); *C08J 3/24* (2013.01); *C22B 61/00* (2013.01); *C08J 2329/02* (2013.01); *G21G 2001/0042* (2013.01)

(58) Field of Classification Search
CPC ............. C08J 3/24; C22B 61/00; G21G 1/001
See application file for complete search history.

(56) References Cited

U.S. PATENT DOCUMENTS 4,123,497 A * 10/1978 Ruddock ................. 423/249
5,372,794 A   12/1994 Lemaire
(Continued)

OTHER PUBLICATIONS

Anders, Edward, The Radiochemistry of Technetium, Nov. 1960, Subcommittee on Radiochemistry, National Academy of Sciences, National Research Council.
(Continued)

*Primary Examiner* — George Wyszomierski
*Assistant Examiner* — Tima M McGuthry Banks
(74) *Attorney, Agent, or Firm* — Oyen Wiggs Green & Mutala LLP

(57) ABSTRACT

Systems and methods for separation or isolation of technetium radioisotopes from aqueous solutions of radioactive or non-radioactive molybdate salts using a polyalkyl glycol-based cross-linked polyether polymer. Some embodiments can be used for the effective purification of radioactive technetium-99m produced from low specific activity $^{99}$Mo.

18 Claims, 4 Drawing Sheets

(56) References Cited

U.S. PATENT DOCUMENTS

| | | | |
|---|---|---|---|
| 5,603,834 | A | 2/1997 | Rogers |
| 5,707,525 | A | 1/1998 | Rogers |
| 5,888,397 | A | 3/1999 | Rogers |
| 6,998,052 | B2 | 2/2006 | Horwitz |
| 7,235,297 | B2 | 6/2007 | Cote |
| 7,842,767 | B2 | 11/2010 | Cote |
| 2011/0065680 | A1 | 3/2011 | Alberto |

OTHER PUBLICATIONS

Andersson, J.D., et al., "Separation of molybdenum and technetium", AIP Conference Proceedings—American Institute of Physics, 2012, vol. 1509, No. 1, 1 page.

Benard, Francois, et al., "Crosslinked polyethylene glycol beads are highly effective to separate 99mTc-pertechnetate from low specific activity molybdenum", The Journal of Nuclear Medicine, 2014, 55(11): 1910-1914.

Bond, A.H., et al., "Design, synthesis, and uptake performance of ABEC resins for the removal of pertechnetate from alkaline radioactive wastes", Ind Eng Chem Res, 1999, 38:1676-1682.

Camperi, Silvia A., et al., "An efficient strategy for the preparation of one-bead-one-peptide libraries on a new biocompatible solid support", Tetrahedron Letters, 2005, 46:1561-1564.

Dash, A., et al., "99Mo/99mTc separation: An assessment of technology options", Nucl Med Biol, 2012, 40(2):167-176.

Garcia-Martin, F., et al., "ChemMatrix, a poly(ethylene glycol)-based support for the solid-phase synthesis of complex peptides", J Comb Chem, 2006, 8(2):213-220.

Griffin, S.T., et al., "The opposite effect of temperature on polyethylene glycol-based aqueous biphasic systems versus aqueous biphasic extraction chromatographic resins", Journal of Chromatography B, 2006, 844:23-31.

Huddleston, J.G., et al., "Metal ion separations in aqueous biphasic systems and with ABEC resins", Methods in Biotechnology, 2000, 11:77-94.

Huffman, E.H., et al., "Anion-exchange separation of molybdenum and technetium and of tungsten and rhenium", J Inorg Nucl Chem, 1956, 3:49-53.

IAEA Nuclear Energy Series No. NF-T-5.4, "Non-Heu production technologies for molybdenum-99 and technetium-99m", International Atomic Energy Agency, Vienna, 2013.

Knapp, F.F., et al., "Use of a new tandem cation/anion exchange system with clinical scale generators provides high specific volume solutions of technetium-99m and rhenium-188", Presented at the International Symposium on Modern Trends in Radiopharmaceuticals for Diagnosis and Therapy, Lisbon, Portugal, Mar. 30 to Apr. 3, 1998, pp. 419-425. IAEA.

Maksin, D.D., et al., "Modeling of kinetics of pertechnetate removal by amino-functionalized gycidyl methacrylate copolymer", Polymer Bulletin, 2012, 68(2):507-528.

McAlister, D.R., et al., "Method for the separation of Tc-99m from low specific activity Mo-99", National Meeting of the ACS, Spring 2012, San Diego,California.

Morley, Thomas J., et al. "An automated module for the separation and purification of cyclotron-production 99TcO4−", Nuclear Medicine and Biology, 2012, 39:551-559.

Remenec, Boris, et al., "Determination of 99Tc in evaporator concentrates using solid phase extraction techniques", J Radioanal Nucl Chem, 2011, 290:403-407.

Sen Sarma, R.N., et al., "Deviations from plate theory in the ion-exchange separation of technetium and rhenium", J Phys Chem, 1959, 63(4): 559-565.

Wang-ChemMatrix.PCAS BioMatrix Inc. <http://www.pcasbiomatrix.com/wang-chemmatrix.html> Accessed Jul. 27, 2015, 1 page.

What resin should I use? PCAS BioMatrix Inc.<http://www.pcasbiomatrix.com/what_resin.html> Accessed Jul. 27, 2015, 1 page.

Aminomethyl-ChemMatrix. PCAS BioMatrix Inc. <http://pcasbiomatrix.com/aminomethyl_chemmatrix.html> Accessed Jul. 27, 2015, 1 page.

Zeisler, Stefan, "Cyclotron production of technetium-99m", Workshop on Accelerator-driven Production of Medical Isotopes, Dec. 8-9, 2011. Daresbury Laboratory, UK.

\* cited by examiner

PROCESS AND APPARATUS FOR SEPARATION OF TECHNETIUM-99M FROM MOLYBDATE

CROSS-REFERENCE TO RELATED APPLICATIONS

This application is a national phase entry under 35 U.S.C. 371 of Patent Cooperation Treaty patent application No. PCT/IB2013/061234 filed 20 Dec. 2013, which claims the benefit of U.S. provisional patent application No. 61/745,379 filed 21 Dec. 2012, both of which are incorporated by reference herein.

FIELD OF THE INVENTION

Some embodiments of the present invention relate to improved methods or apparatus for separation or purification of salts of technetium from aqueous solutions containing one or more contaminants, including mixtures of salts of technetium and molybdenum. Some embodiments provide a two-phase extraction process for isolation and purification of salts of technetium-99m (Tc-99m) radioisotope from aqueous solutions containing radioactive (i.e. Mo-99) or non-radioactive (i.e. natural or isotopically enriched) salts of molybdenum.

BACKGROUND OF THE INVENTION

Technetium-99m (Tc-99m) is the most commonly used radioisotope in nuclear medicine. Tc-99m is typically obtained as a daughter radionuclide from its parent isotope, molybdenum-99 (Mo-99), itself produced from the fission of uranium-235 in nuclear reactors. The Mo-99 is typically packaged in an alumina cartridge, to which it binds tightly, and Tc-99m pertechnetate is eluted from the alumina cartridge by using an isotonic sodium chloride solution. This device, called a generator, is optimally used with high specific activity Mo-99, due to the low binding capacity of the alumina cartridges. Low specific activity Mo-99 is obtained with alternative production methods such as neutron enrichment of Mo-98, or by the use of the photon-neutron process by a linear accelerator. In addition, during the manufacturing process of Tc-99m using medical cyclotrons using Mo-100, a large excess of the target material (Mo-100) remains with the Tc-99m after dissolution of the target material. The use of larger alumina cartridges leads to large elution volumes of Tc-99m, which limits its practical utility for clinical use.

Several authors have reported various methods to separate Tc-99m from low specific activity molybdenum. Zirconium molybdate gels have been used to immobilize molybdenum (Evans, 1987), and this type of generator is used in countries that rely on low specific activity Mo-99. Liquid extraction chromatography of Tc-99m with methyl ethyl ketone was also used to isolate Tc-99m, but this approach is less amenable to automation and can be technically challenging (Dash, 2012). The use of ion exchange separation chromatography to separate technetium from molybdenum has been known since the 1950s using Dowex resins for example, and several improvements to this approach have been reported over the years. Various authors have reported the use of sequential solid phase extraction cartridges to concentrate Tc-99m and reduce the volume of the eluates (Blower, 1993). A summary of various methods available for Tc-99m purification from Mo-99 was recently published on-line (Dash, 2012). Rogers et al. reported the use of aqueous biphasic chromatography (Rogers 1993-1997). The use of polyethylene/polypropylene glycols (PEG/PPG) covalently attached to polystyrene particles for the separation of Tc-99m is described in U.S. Pat. No. 5,603,834, which is hereby incorporated by reference, and is available commercially under the name ABEC (aqueous biphasic extraction chromatography).

Among the various methods available, the inventors have previously tested the use of strong anion exchange resins as well as ABEC resin to separate Tc-99m from low specific activity molybdenum (Morley, 2012). Both methods gave adequate results. The anion exchange method (using Dowex 1X8 resin) suffers from the disadvantage of using organic solvents and quaternary amines, which complicate the quality control of the final product. The ABEC resin provided better performance but led to some losses of Tc-99m due to incomplete trapping or elution of the Tc-99m. In addition, polystyrene resins are sensitive to heat, and their resistance to radiolysis is unknown.

It has been known for some years that PEG-linked polystyrene resins could improve the yields for solid-phase synthesis of some peptides. A cross-linked resin made wholly from polyethylene glycol, without attachment to a particle or polystyrene bead, has been developed for solid-phase peptide synthesis and is commercially available from PCAS Biomatrix Inc., under the name 'ChemMatrix'® (Garcia-Martin 2006). This completely PEG based resin is sold with various functional groups for solid phase peptide synthesis. Compared to polystyrene-based resins, these resins have a high binding capacity, improved chemical resistance, and higher swelling in water.

There remains a need for improved procedures for purification and separation of Tc-99m salts from solutions of parent isotopes of molybdenum that are produced from lower activity sources, e.g. during cyclotron or linear accelerator (LINAC) bombardment of enriched molybdenum targets, or from neutron capture of natural or enriched Mo-98 in a nuclear reactor.

SUMMARY OF THE INVENTION

Polyalkyl glycol-based cross-linked polyether polymers useful for the separation of technetium-99m (Tc-99m) from one or more contaminants including molybdenum 98 (Mo-98), molybdenum-99 (Mo-99) and/or molybdenum-100 (Mo-100) are provided.

One embodiment provides a method of separating technetium-99m (Tc-99m) from one or more contaminants. A target solution containing technetium-99m (Tc-99m) and one or more contaminants is obtained in any suitable manner. The target solution is loaded on a solid support comprising a polyalkyl glycol-based cross-linked polyether polymer under conditions favouring interaction of the technetium-99m (Tc-99m) with the solid support. The solid support is washed under conditions favouring interaction of the technetium-99m (Tc-99m) with the solid support. The technetium-99m (Tc-99m) is eluted from the solid support with an elution solution under conditions promoting release of the technetium-99m (Tc-99m) from the solid support.

In some embodiments, the eluted solution from the solid support is passed through a strong cation exchange resin. The resulting solution is then passed through an alumina column to which the technetium-99m (Tc-99m) binds. The technetium-99m (Tc-99m) is eluted from the alumina column with a saline solution. In some embodiments, the saline solution is a sterile solution of 0.9% w/v NaCl.

In some embodiments, the solid support is a cross-linked polyalkyl glycol having the general formula

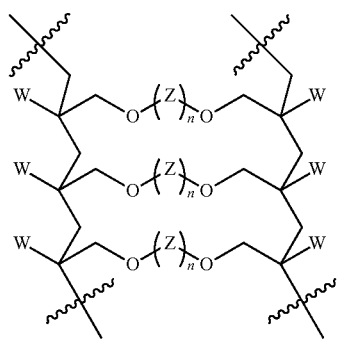

wherein Z is an alkyl group including without limitation —CH₂CH₂—, —CH(CH₃)CH₂—, —CH₂CH₂CH₂CH₂—, or a mixture thereof. In some embodiments, W has one of the following structures:

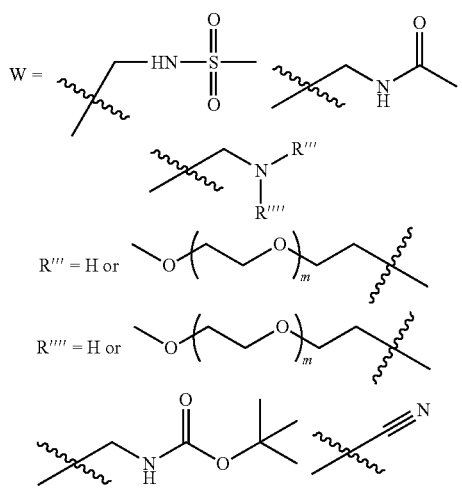

wherein m and n can independently be an integer having a value between 1 and 1000.

Further aspects of the invention will become apparent from consideration of the ensuing description of preferred embodiments of the invention. A person skilled in the art will realise that other embodiments of the invention are possible and that the details of the invention can be modified in a number of respects, all without departing from the inventive concept. Thus, the following drawings, descriptions and examples are to be regarded as illustrative in nature and are not restrictive.

BRIEF DESCRIPTION OF THE DRAWINGS

Exemplary embodiments are illustrated in referenced figures of the drawings.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

In some embodiments, cross-linked polymeric glycol-based resins are used in procedures for the two-phase purification and isolation of Tc-99m containing salts from solutions comprising mixtures of radioactive or non-radioactive molybdenum-containing salts and Tc-99m-containing salts.

In some embodiments, the cross-linked polymeric glycol-based resins comprise a polyalkyl glycol-based cross-linked polyether polymer, such as, but not limited to, a polyethylene glycol-(PEG), propylene glycol-(PPG), or polytetrahydrofuran-(polyTHF))-based cross-linked polyether polymer, for example as described in U.S. Pat. No. 7,235,297 or U.S. Pat. No. 7,842,767 to Cote, both of which are incorporated by reference herein.

Figure 1:
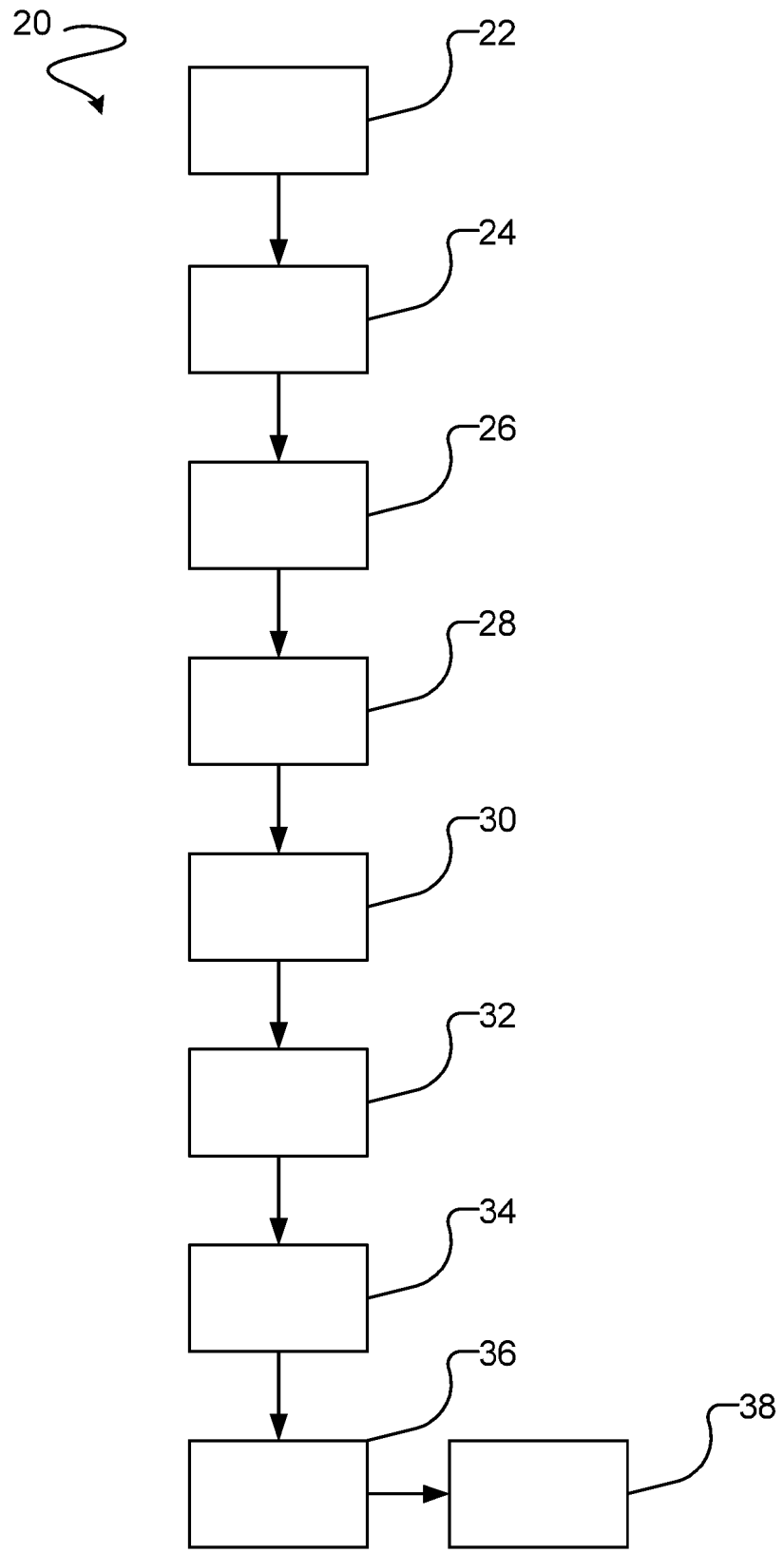
FIG. 1 shows an example process for separating Tc-99m according to one embodiment.

With reference to FIG. 1, an example embodiment of a process 20 for obtaining Tc-99m is illustrated. At 22, a solution containing Tc-99m is obtained in any suitable manner now known or developed in future. At 24, the condition of the solution is adjusted to render it suitable for biphasic separation. In some embodiments, the solution is adjusted by increasing the pH to a basic pH. In some embodiments, the solution is adjusted by both increasing the pH to a basic pH and increasing the concentration of salt in the solution. In some embodiments, the same agent both increases the pH and increases the concentration of salt in solution. In some embodiments, the pH of the solution and the salt concentration of the solution are increased by adding a concentrated solution of a strong base, for example, sodium hydroxide (NaOH) or potassium hydroxide (KOH). In some embodiments, the concentration of the concentrated solution of strong base that is added to the solution is 1 N or higher, e.g. 2 N, 3 N, or 4 N.

In some embodiments, at 24 the condition of the solution is adjusted to render it suitable for biphasic separation by adding a sufficient amount of an ammonium or alkali metal cation and one or more of the following anions: hydroxide, fluoride, carbonate, silicate, sulphate, phosphate, dihydrogen phosphate, hydrogen phosphate, formate, succinate, tartrate, citrate, chromate, molybdate, tungstate, orthovanadate, thiocyanate, thiosulfate, fluorosilicate, orthosilicate, hydroxyethane-1,1-diphosphonate, or vinylidene-1,1-diphosphonate, as taught in U.S. Pat. No. 5,603,834, which is incorporated by reference herein in its entirety. In some embodiments, the concentration of the anion is about 0.05 molar or above, for example any concentration up to the saturation concentration.

Without being bound by theory, solid phase extraction of Tc-99m from Mo works particularly efficiently where Mo is present as (mono-)molybdate, $MoO_4^{2-}$. This occurs when the pH of the solution is in the range of 8 to 9 or higher. In some embodiments, at 24, the pH of the solution is adjusted to a pH higher than about 8, including e.g. 9, 10, 11, 12, 13 or 14.

In some embodiments, the salt concentration that renders the solution suitable for biphasic separation is provided in the form of hydroxide ($OH^-$) added for example as NaOH or KOH. Such embodiments can assist in recycling Mo-100 used in the Tc-99m generation process, because there is no anion that needs to be removed in the recycling process.

At 26, the resulting solution from adjustment step 24 is loaded on a polyalkyl glycol-based cross-linked polyether polymer solid support under conditions such that the Tc-99m remains associated with the solid support. In some embodiments, steps 24 and 26 are combined, i.e. the condition of solution 22 can be adjusted to render it suitable for biphasic separation at the same time that the solution is loaded on the solid support.

In some embodiments, the conditions that cause the Tc-99m to remain associated with the solid support are the same as the conditions that render solution 22 suitable for biphasic separation. In some embodiments, the conditions that cause the Tc-99m to remain associated with the solid support are the same as the conditions to which the solution 22 is adjusted at step 24.

At 28, the solid support is washed under conditions such that the Tc-99m remains associated with the solid support. In some embodiments, the conditions that cause the Tc-99m to remain associated with the solid support during washing are the same as the conditions that render solution 22 suitable for biphasic separation. In some embodiments, the conditions that cause the Tc-99m to remain associated with the solid support during washing are the same as the conditions to which the solution 22 is adjusted at step 24. In some embodiments, the solid support is washed with a basic aqueous solution. In some embodiments, the solid support is washed with a solution of a strong base, for example, sodium hydroxide (NaOH) or potassium hydroxide (KOH). In some embodiments, the concentration of the strong base that is used to wash the solid support is 1 N or higher, e.g. 2 N, 3 N, or 4 N. In some embodiments, the pH of the solution used to wash the solid support is a pH of about 8 or higher, including e.g. 9, 10, 11, 12, 13 or 14.

At 30, the Tc-99m is eluted from the solid support under conditions that cause the Tc-99m to be released from the solid support. In some embodiments, the conditions that cause the Tc-99m to be released from the solid support are acidic or neutral conditions. In some embodiments, the conditions that cause the Tc-99m to be released from the solid support are a decrease in salt concentration. In some embodiments, the conditions that cause the Tc-99m to be released from the solid support are both a decrease in pH and a decrease in salt concentration. In some embodiments, the Tc-99m is eluted from the solid support with water. In some embodiments, the Tc-99m is eluted from the solid support with deionized water. In some embodiments, the solution used to elute the Tc-99m from the solid support has a pH of lower than 7, including in the range of about 5.5 to about 7, or any value therebetween, including e.g. 6.0 or 6.5.

In some embodiments, at 32, the eluted Tc-99m is further treated by passing the eluate from 30 through a strong cation exchange resin that neutralizes the eluate and/or removes any potential residual cations such as sodium. An example of a suitable strong cation exchange resin is an OnGuard™ II H column available from Dionex Products/Thermo Scientific. Any suitable strong cation exchange resin can be used in this step. The Tc-99m is not retained to a significant degree by the strong cation exchange resin, and passes out with the rest of the eluate.

In some embodiments, after being subjected to the strong cation exchange resin at 32, the Tc-99m is bound to an alumina cartridge at 34. An example of a suitable alumina cartridge is an alumina A Sep-Pak cartridge available from Waters. Tc-99m is retained with near quantitative efficiency on the alumina cartridge, as are any remaining traces of molybdenum and Mo-99.

At 36, the Tc-99m is eluted from the alumina cartridge with an aqueous solution containing a suitable salt. In some embodiments, the Tc-99m is eluted with a physiologically compatible aqueous solution to yield a pharmacologically acceptable solution of Tc-99m for use in animals including humans at 38. In some embodiments, the Tc-99m is eluted in an isotonic saline solution (i.e. a saline solution having approximately the same concentration of solutes as the blood of a mammal including a human). In some embodiments, the Tc-99m is eluted in a salt solution containing in the range of 0.9% w/v NaCl to provide a solution suitable for immediate physiological use (e.g. direct injection into a patient). The pH of a normal saline solution is approximately 7. It will be recognized by one skilled in the art that higher salt concentrations can be used to elute the Tc-99m from the alumina cartridge; however, the resultant solution would then need to be diluted to render it suitable for use with an animal including a human. Similarly, other physiologically compatible buffers could be used to elute the Tc-99m, for example if a solution other than an NaCl solution provides advantages for downstream processing of the Tc-99m (e.g. labelling). In some embodiments, the solution used for elution at 36 is sterile.

Residual molybdenum including Mo-99 remains trapped on the alumina cartridge while the Tc-99m is eluted as solution 38.

In some embodiments, the efficiency of recovery of Tc-99m from the starting solution is above 90%, including 92%, 94%, 95%, 96%, 97%, 98%, 99% and 100%.

In some embodiments, the solid support comprises a polyalkyl glycol-based cross-linked polyether polymer, such as, but not limited to, a polyethylene glycol-(PEG), propylene glycol-(PPG), or polytetrahydrofuran-(polyTHF))-based cross-linked polyether polymer, for example as described in U.S. Pat. No. 7,235,297 or U.S. Pat. No. 7,842,767 to Cote, both of which are incorporated by reference herein. As described in these patents, in some embodiments, the solid support is a cross-linked polyether derived from a cross-linked polyester which is obtained by copolymerization of at least one monomer comprising (a) a one-ended polymerizable vinyl or allyl ketone, ester, ether or mixtures thereof with at least one cross-linker having at least two polymerizable terminal end groups, with the exception of epoxy and oxetane end groups, or (b) divinyl benzene. In some embodiments, the solid support is obtained by copolymerizing at least one monomer derivative of an acrylic, methacrylic, maleic and/or itaconic acid with (a) at least one cross-linker having at least two polymerizable terminal end groups, with the exception of epoxy and oxetane end groups, or (b) divinyl benzene to produce a cross-linked polyester. The cross-linked polyester is reduced to give a cross-linked polyol resin, and the cross-linked polyol resin is reacted with a cyclic ether or a cyclic amine to give the cross-linked polyether solid support.

In some embodiments, the solid support comprises a cross-linked polyether which is obtained by polymerizing a monomer of the general formula:

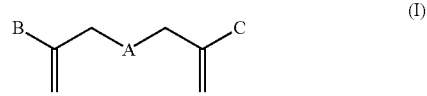

(I)

wherein A is a polyalkyl glycol, such as but not limited to polyethylene glycol (PEG), polypropylene glycol (PPG), or polytetrahydrofuran (poly(THF)), or a combination thereof, or a variant thereof; and B and C are independently electron-withdrawing groups (e.g. EWGs such as cyano, ester, amide, formyl, ketone, halogen, nitro, sulfoxide, ketone, and the like). In some embodiments, all the monomers of the cross-linked polyether are identical.

In some embodiments, the solid support comprises a cross-linked polyether which is obtained by polymerization of at least one monomer selected from the group consisting of (a) (α-X-methyl) vinyl-EWG, (α-X-methyl) vinyl-ERG, or (α-X-methyl) vinyl-aryl, where X is oxygen, sulfur, PEG, PPG, or poly(THF); (b) a monomer which is polymerizable with a PEG, PPG or poly(THF) cross-linker having at least one (α-X-methyl) vinyl-EWG, (α-X-methyl) vinyl-ERG or (α-X-methyl) vinyl-aryl, where X is oxygen, sulfur, PEG, PPG, or poly(THF); (c) a PEG, PPG, or poly(THF) cross-linker having at least an acrylamide or a methacrylamide end group; and (d) mixtures thereof, where EWG represents an electron withdrawing group, and ERG represents an electron releasing group. The acrylamide or methacrylamide of (c) can be reduced after polymerization to a polyamine. Alternatively, at least two or three of the monomers can be copolymerized. In some embodiments, the electron withdrawing group is halogen, formyl, ester, amide, nitro, sulfoxide, sulfonate, nitrile, aldehyde, or ketone. In some embodiments, the electron releasing group is a $C_1$ to $C_{30}$ linear or branched alkyl, $C_2$ to $C_{30}$ linear or branched aralkyl, $C_1$ to $C_{30}$ aryl, oxygen, sulphur, ether, amine (preferably secondary amine), or the like.

In some embodiments, the cross-linked polyether is synthesized into beaded form. In some embodiments, the beads are formed by normal or inverse suspension.

In one example embodiment, the solid support has the general chemical structure (1) set forth below. In some embodiments, n is an integer between 1 and 1000 or any value therebetween, e.g. 50, 100, 150, 200, 250, 300, 350, 400, 450, 500, 550, 600, 650, 700, 750, 800, 850, 900, or 950. In some embodiments, n is an integer between 1 and 500. In some embodiments, n is an integer between 1 and 400. In some embodiments, n is an integer between 1 and 250. In some embodiments, n is an integer between 15 and 225. In some embodiments, n is an integer between 1 and 100:

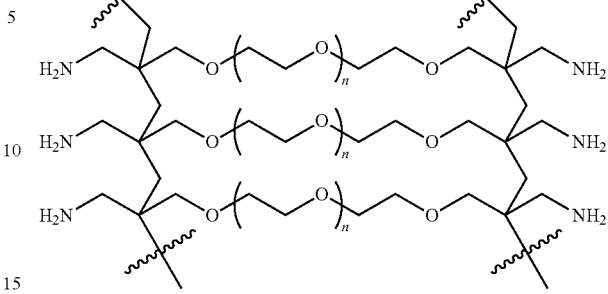

In another example embodiment, the solid support has the general chemical structure (2), (3), (4), (5) or (6) set forth below. In some embodiments, n is an integer between 1 and 1000 or any value therebetween, e.g. 50, 100, 150, 200, 250, 300, 350, 400, 450, 500, 550, 600, 650, 700, 750, 800, 850, 900, or 950. In some embodiments, n is an integer between 1 and 500. In some embodiments, n is an integer between 1 and 400. In some embodiments, n is an integer between 1 and 250. In some embodiments, n is an integer between 15 and 225. In some embodiments, n is an integer between 1 and 100. In some embodiments, m is an integer between 1 and 1000 or any value therebetween, e.g. 50, 100, 150, 200, 250, 300, 350, 400, 450, 500, 550, 600, 650, 700, 750, 800, 850, 900, or 950. In some embodiments, m is an integer between 1 and 500. In some embodiments, m is an integer between 1 and 400. In some embodiments, m is an integer between 1 and 250. In some embodiments, m is an integer between 15 and 225. In some embodiments, m is an integer between 1 and 100.

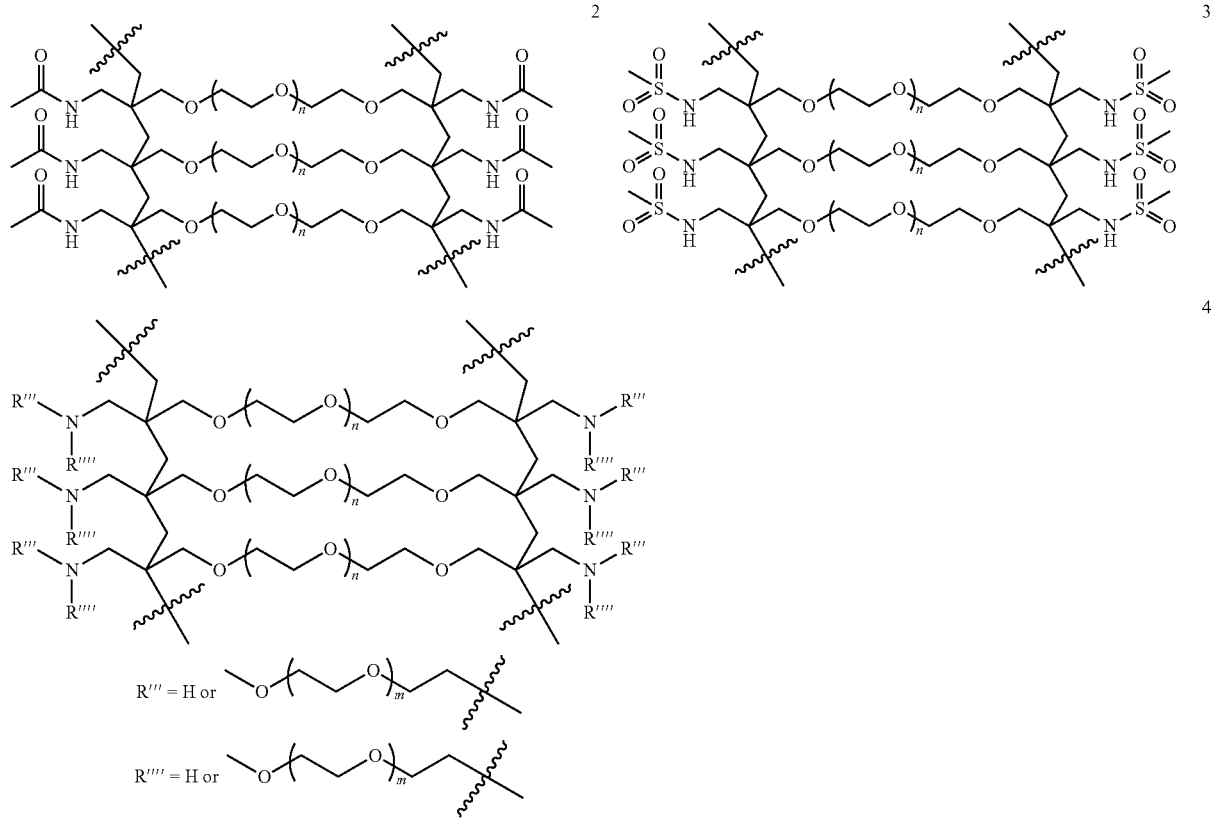

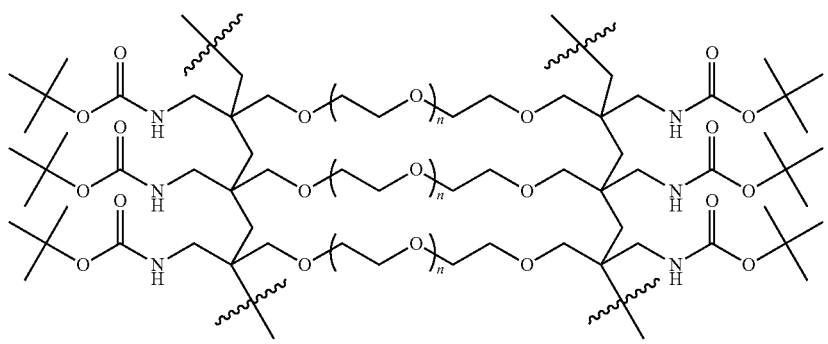

5

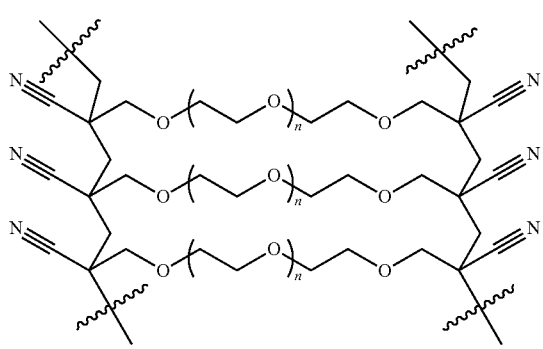

6

Structure (2) is an acetyl-modified form of structure (1). Structure (3) is a mesyl-modified form of structure (1). Structure (4) is a pegylated form of structure (1). Structure (5) is a di-tert-butyl dicarbonate-modified form (i.e. BOC-modified form) of structure (1). Structure (6) is a cross-linked PEG resin polymerized from monomers of structure (I) with cyano as the electron-withdrawing group (i.e. for monomer (I), B=C=CN) to produce structure (6).

In one example embodiment, structure (2) is prepared by reacting a compound having the structure (1), acetic anhydride and N,N-diisopropylethylamine in methylene chloride. The resulting product is recovered by filtration, washed, and dried prior to use.

In one example embodiment, structure (3) is prepared by reacting a compound having the structure (1) with methanesulfonyl chloride and N,N-diisopropylethylamine in methylene chloride. The resulting product is recovered by filtration, washed and dried prior to use.

In one example embodiment, structure (4) is prepared by reacting a compound having the structure (1) with poly (ethylene glycol) methyl ether tosylate and potassium carbonate in acetonitrile. The resulting product is recovered by filtration, washed and dried prior to use.

In one example embodiment, structure (5) is prepared by reacting a compound having the structure (1) with di-tert-butyl dicarbonate and N,N-diisopropylethylamine in methanol. The resulting product is recovered by filtration, washed and dried prior to use.

In one example embodiment, structure (6) is prepared by polymerizing a monomer having the formula (I) wherein A is polyethylene glycol and B and C are nitrile (i.e. cyano) groups. In some embodiments, structure (1) is prepared by reducing the nitrile (i.e. cyano) groups of structure (6) to aminomethyl groups.

In other embodiments, the solid support has the general chemical formula (7), (8), (9), (10), (11), (12), (13), (14), (15), (16), (17), (18), (19), (20), (21), (22), (23), (24), (25), (26), (27), (28), (29), (30), (31), (32), (33), (34), (35), (36), (37), (38), (39), (40), or (41) set forth below, wherein R' and R" can independently be alkyl, aryl or hydrogen. In some embodiments, n is an integer between 1 and 1000 or any value therebetween, e.g. 50, 100, 150, 200, 250, 300, 350, 400, 450, 500, 550, 600, 650, 700, 750, 800, 850, 900, or 950. In some embodiments, n is an integer between 1 and 500. In some embodiments, n is an integer between 1 and 400. In some embodiments, n is an integer between 1 and 250. In some embodiments, n is an integer between 15 and 225. In some embodiments, n is an integer between 1 and 100.

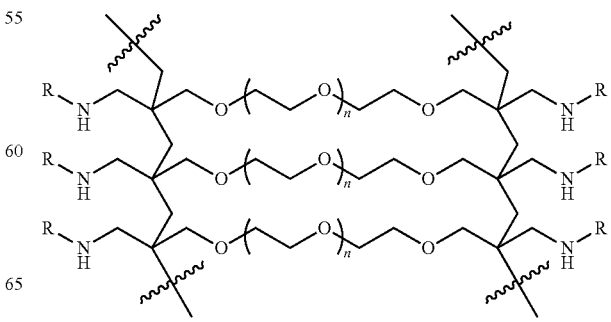

-continued

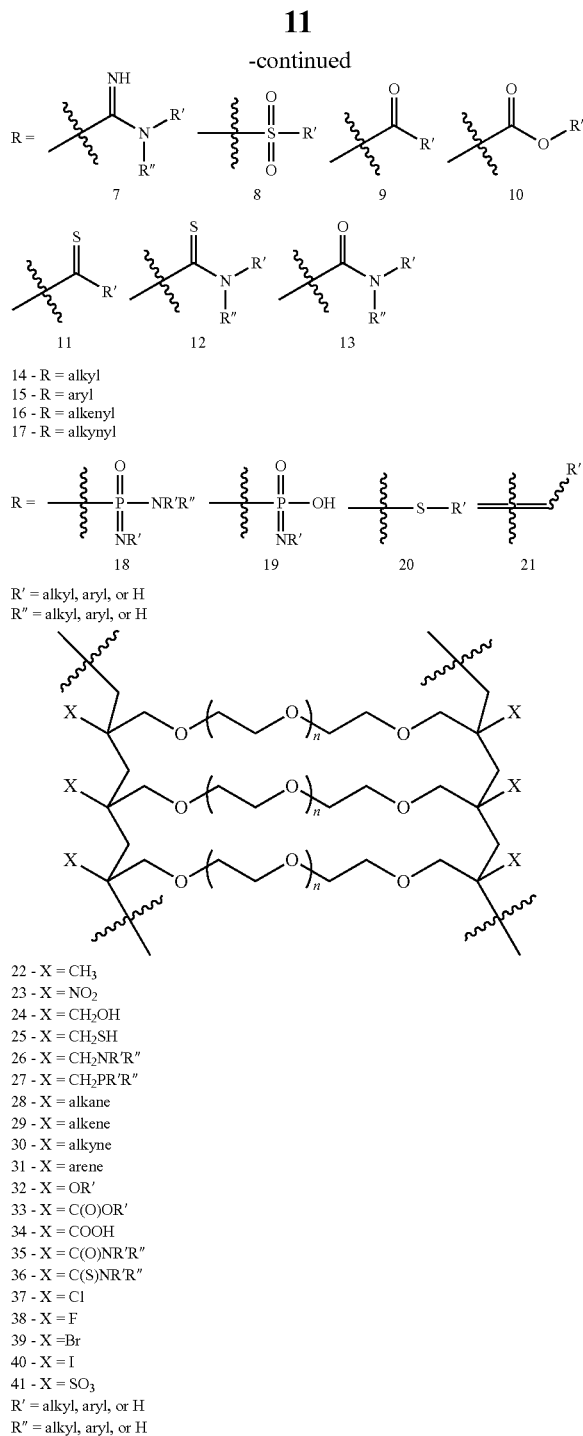

22 - X = CH₃
23 - X = NO₂
24 - X = CH₂OH
25 - X = CH₂SH
26 - X = CH₂NR'R"
27 - X = CH₂PR'R"
28 - X = alkane
29 - X = alkene
30 - X = alkyne
31 - X = arene
32 - X = OR'
33 - X = C(O)OR'
34 - X = COOH
35 - X = C(O)NR'R"
36 - X = C(S)NR'R"
37 - X = Cl
38 - X = F
39 - X = Br
40 - X = I
41 - X = SO₃
R' = alkyl, aryl, or H
R" = alkyl, aryl, or H In some embodiments, the cross-linked polymeric glycol-based resins used for Tc-99m isolation include but are not limited to the ChemMatrix® resins produced and commercially available from PCAS Biomatrix Inc. of St-Jean-sur-Richelieu, Quebec, Canada. The ChemMatrix resins are described in U.S. Pat. Nos. 7,235,297 and 7,842,767, which are incorporated by reference herein, as well as reported in the scientific literature (see Garcia-Martin 2006 and Garcia-Ramos 2010, each of which is incorporated herein by reference).

In one embodiment, the ChemMatrix® resin used in methods of the invention disclosed herein to isolate Tc-99m is Aminomethyl-ChemMatrix® (PCAS Biomatrix product number 7-111-1310). Aminomethyl-ChemMatrix® has the general structure (1) set forth above.

In other example embodiments, the ChemMatrix® resins used in methods of the invention disclosed herein to isolate Tc-99m include one or more of the following set of resins: H-Rink Amide-ChemMatrix® (PCAS Biomatrix product number 7-600-1310) having the structure (42) below, H-Ramage-ChemMatrix® (PCAS Biomatrix product number 7-750-1310) having the structure (43) below, H-PAL-ChemMatrix® (PCAS Biomatrix product number 7-550-1310) having the structure (44) below, HMPB-ChemMatrix® (PCAS Biomatrix product number 7-820-1310) having the structure (45) below, Trityl-OH ChemMatrix® (PCAS Biomatrix product number 7-420-1310) having the structure (46) below or Wang-ChemMatrix® (PCAS Biomatrix product number 7-320-1310) having the structure (47) below. In some embodiments, n is an integer between 1 and 1000 or any value therebetween, e.g. 50, 100, 150, 200, 250, 300, 350, 400, 450, 500, 550, 600, 650, 700, 750, 800, 850, 900, or 950. In some embodiments, n is an integer between 1 and 500. In some embodiments, n is an integer between 1 and 400. In some embodiments, n is an integer between 1 and 250. In some embodiments, n is an integer between 15 and 225. In some embodiments, n is an integer between 1 and 100.

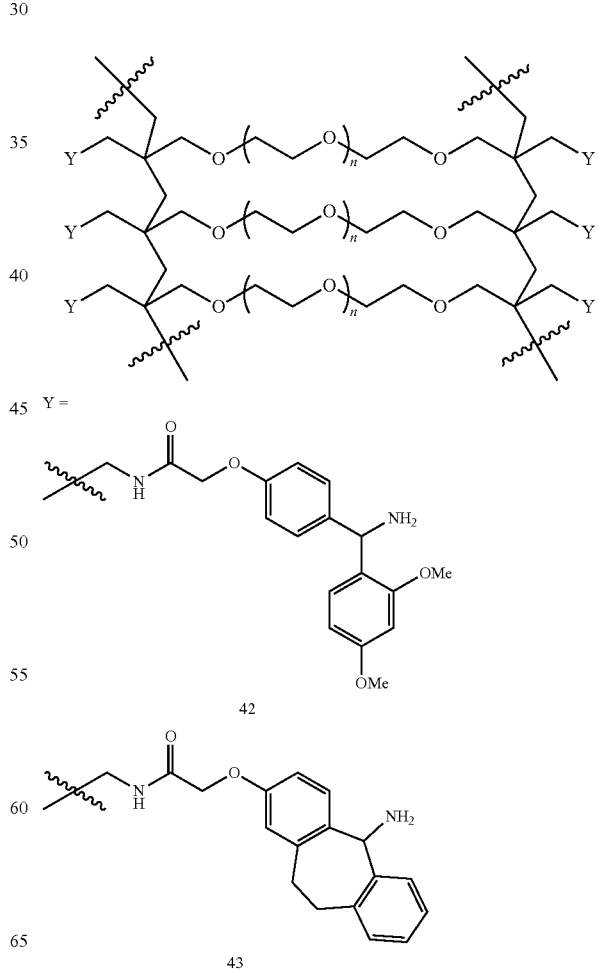

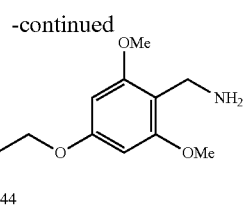

44

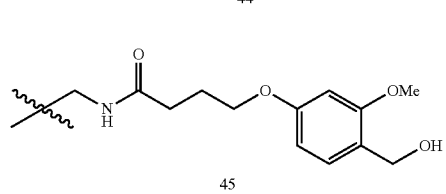

45

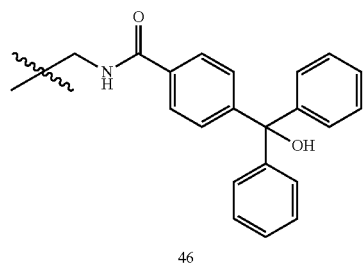

46

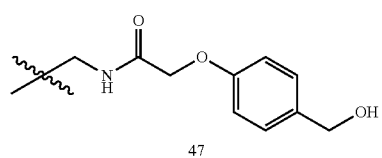

47

In some embodiments, the polyalkyl glycol-based cross-linked polyether polymer has a general formula corresponding to any one of structures (1), (2), (3), (4), (5), (6) (7), (8), (9), (10), (11), (12), (13), (14), (15), (16), (17), (18), (19), (20), (21), (22), (23), (24), (25), (26), (27), (28), (29), (30), (31), (32), (33), (34), (35), (36), (37), (38), (39), (40), (41), (42), (43), (44), (45), (46) or (47) set forth above, wherein the polyethylene glycol-based cross-linked polyether polymer is replaced by a different polyalkyl glycol-based cross-linked polyether polymer, for example a polypropylene glycol-, or polytetrahydrofuran-based cross-linked polyether polymer, or mixtures thereof. Such structures are represented by the following general chemical structure (48):

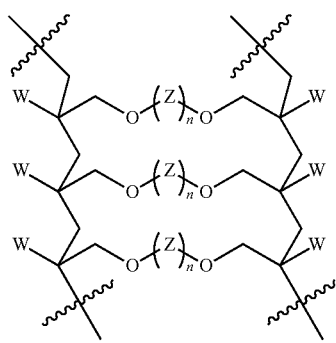

48 wherein Z is an alkyl group. In some embodiments, W is: (a) any one of the structures specified for X in structures (22), (23), (24), (25), (26), (27), (28), (29), (30), (31), (32), (33), (34), (35), (36), (37), (38), (39), (40), or (41); (b) —CH$_2$—NH—R, where R is any one of the structures specified for R in structures (7), (8), (9), (10), (11), (12), (13), (14), (15), (16), (17), (18), (19), (20), or (21); or (c) —CH$_2$—Y, where Y is any one of the structures specified for Y in structures (42), (43), (44), (45), (46) or (47). In some embodiments, n is an integer between 1 and 1000 or any value therebetween, e.g. 50, 100, 150, 200, 250, 300, 350, 400, 450, 500, 550, 600, 650, 700, 750, 800, 850, 900, or 950. In some embodiments, n is an integer between 1 and 500. In some embodiments, n is an integer between 1 and 400. In some embodiments, n is an integer between 1 and 250. In some embodiments, n is an integer between 15 and 225. In some embodiments, n is an integer between 1 and 100.

In embodiments in which the polyalkyl glycol-based cross-linked polyether polymer is based on polyethylene glycol, Z is —CH$_2$CH$_2$—, yielding a polymer with the general structure (49):

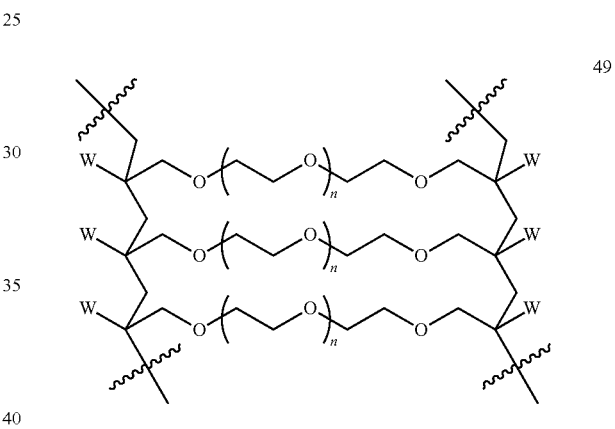

49

In embodiments in which the polyalkyl glycol-based cross-linked polyether polymer is based on polypropylene glycol, Z is —CH(CH$_3$)CH$_2$—, yielding a polymer with the general structure (50):

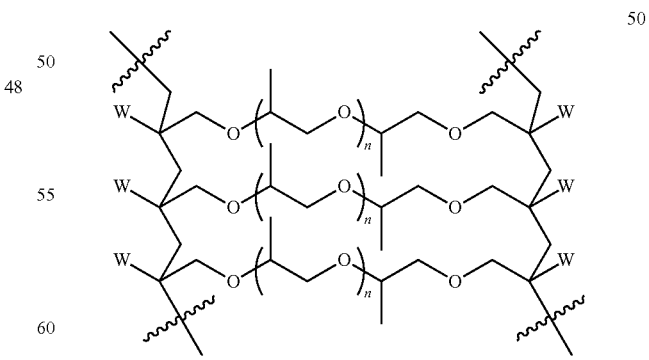

50

In embodiments in which the polyalkyl glycol-based cross-linked polyether polymer is based on polytetrahydrofuran, Z is —CH$_2$CH$_2$CH$_2$CH$_2$—, yielding a polymer with the general structure (51):

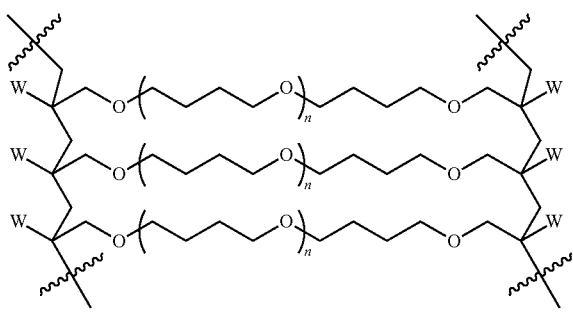

In some embodiments, W has the following structure:

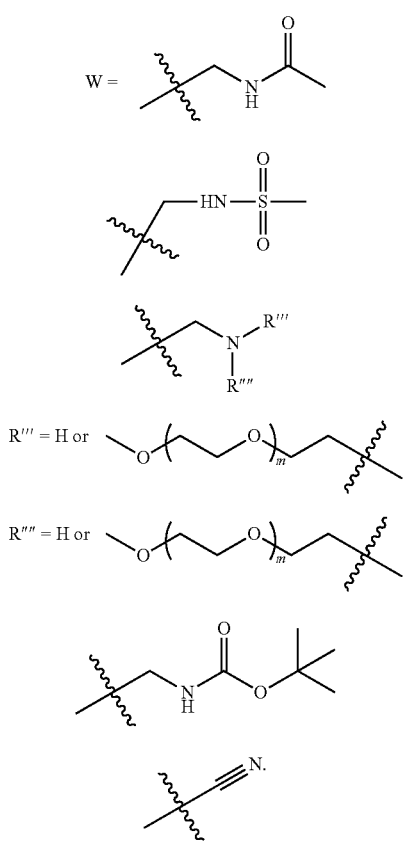

Structure (52) is an acetyl-modified form of structure (48). Structure (53) is a mesyl-modified form of structure (48). Structure (54) is a pegylated form of structure (48). Structure (55) is a di-tert-butyl dicarbonate-modified form (i.e. BOC-modified form) of structure (48). Structure (56) is a cross-linked polyalkyl glycol resin polymerized from monomers of structure (I) with cyano as the electron-withdrawing group (i.e. for monomer (I), B=C=CN) and a polyalkyl glycol group as A to produce structure (56).

In one example embodiment, structure (52) is prepared by reacting a compound having the structure (48) wherein W is —$CH_2$—$NH_2$, acetic anhydride and N,N-diisopropylethylamine in methylene chloride. The resulting product is recovered by filtration, washed, and dried prior to use.

In one example embodiment, structure (53) is prepared by reacting a compound having the structure (48) wherein W is —$CH_2$—$NH_2$ with methanesulfonyl chloride and N,N-diisopropylethylamine in methylene chloride. The resulting product is recovered by filtration, washed and dried prior to use.

In one example embodiment, structure (54) is prepared by reacting a compound having the structure (48) wherein W is —$CH_2$—$NH_2$ with poly(ethylene glycol) methyl ether tosylate and potassium carbonate in acetonitrile. The resulting product is recovered by filtration, washed and dried prior to use.

In one example embodiment, structure (55) is prepared by reacting a compound having the structure (48) wherein W is —$CH_2$—$NH_2$ with di-tert-butyl dicarbonate and N,N-diisopropylethylamine in methanol. The resulting product is recovered by filtration, washed and dried prior to use.

In one example embodiment, structure (56) is prepared by polymerizing a monomer having the formula (I) wherein A is a polyalkyl glycol and B and C are nitrile (i.e. cyano) groups.

In another example embodiment, the resins used in methods disclosed herein to isolate Tc-99m are prepared by chemically modifying the Aminomethyl-ChemMatrix® resin, to, by way of non-limiting example, remove or de-activate the C-terminal amine functional groups of the Aminomethyl-ChemMatrix® resin, and replace these with alternative chemical groups in order to avoid or minimize charge interactions with the Tc-99m pertechnetate ionic species.

In one embodiment of the invention, the chemically modified ChemMatrix® resin, useful for isolating Tc-99m is acetyl-modified ChemMatrix® having the structure (2) set forth above. In some embodiments, the acetyl-modified ChemMatrix® having structure (2) is prepared by chemical modification of Aminomethyl-ChemMatrix® by reacting the Aminomethyl-ChemMatrix® resin having the structure (1) with acetic anhydride and N,N-diisopropylethylamine in methylene chloride.

In another embodiment of the invention, the chemically modified ChemMatrix® resin, useful for isolating Tc-99m is mesyl-modified ChemMatrix® having the structure (3) set forth above, and is prepared by chemical modification of Aminomethyl-ChemMatrix® resin by reacting the Aminomethyl-ChemMatrix® having the structure (1) with methanesulfonyl chloride and N,N-diisopropylethylamine in methylene chloride.

In another embodiment of the invention, the chemically modified ChemMatrix® resin, useful for isolating Tc-99m is a pegylated ChemMatrix® resin having the structure (4) set forth above, and is prepared by chemical modification of Aminomethyl-ChemMatrix® resin by reacting Aminomethyl-ChemMatrix® having the strucuture (1) with poly(ethylene glycol) methyl ether tosylate and potassium carbonate in acetonitrile.

In another embodiment of the invention, the chemically modified ChemMatrix® resin, useful for isolating Tc-99m is BOC-ChemMatrix® having the structure (5) set forth above, and is prepared by chemical modification of Aminomethyl-ChemMatrix® resin by reacting Aminomethyl-ChemMatrix® having the strucuture (1) with di-tert-butyl dicarbonate and N,N-diisopropylethylamine in methanol.

Other chemically modified polyalkyl glycol-based cross-linked polyether polymer resins can be prepared that are useful for isolating Tc-99m from aqueous solutions containing molybdate as described in methods of the invention disclosed herein. These alternative chemically modified polyalkyl glycol-based cross-linked polyether polymer resins and their use for isolation of Tc-99m are within the scope of some embodiments of the present invention. Said modifications of polyalkyl glycol-based cross-linked polyether polymer resins include but are not limited to: (1) inactivating amine groups of a polyalkyl glycol-based cross-linked polyether polymer resin (such as the aminomethyl-ChemMatrix® resin) by the formation of amides, carbamates, ureas, sulfonamides, phosphinamides, phosphoramides, sulfenamides, or imines; (2) converting the primary amine groups of a polyalkyl glycol-based cross-linked polyether polymer resin (such as the aminomethyl-ChemMatrix resin) to other functional groups such as secondary amine, tertiary amine, nitro, hydroxy, hydrocarbon (alkane, alkene, alkyne, and arene), ether, halide, nitrile, ester, or acid; (3) preparation of a polyalkyl glycol-based cross-linked polyether polymer resin devoid of amino groups; or (4) adding polyalkyl glycol groups of various lengths (including without limitation polyethylene glycol, polypropylene glycol, or polytetrahydrofuran) to the amine groups of the polyalkyl glycol-based cross-linked polyether polymer resin (such as Aminomethyl-ChemMatrix®).

The target solution containing Tc-99m and one or more contaminants can be obtained in any suitable manner. In some embodiments, the Tc-99m is obtained by neutron capture of Mo-98, for example via the $^{98}Mo(n,\gamma)^{99}Mo$ transformation. In some embodiments, the Tc-99m is obtained by the irradiation of highly enriched uranium (HEU) or low enriched uranium (LEU), for example via the $^{235,238}U(n,f)^{99}Mo$ transformations. In some embodiments, the Tc-99m is obtained by a proton-induced process using a linear accelerator to bombard a natural or enriched molybdenum target comprising Mo-100, for example via $^{100}Mo(p,2n)^{99m}Tc$. In some embodiments, the Tc-99m is obtained by a proton-induced process using a medical cyclotron to bombard a natural or enriched molybdenum target comprising Mo-100, for example via $^{100}Mo(p,2n)^{99m}Tc$. In some embodiments, the Tc-99m is obtained by a deuteron induced process using a linear accelerator or a cyclotron to bombard a natural or an enriched molybdenum target comprising Mo-100, for example via $^{100}Mo(d,3n)^{99m}Tc$. In some embodiments, the Tc-99m is obtained using accelerator-based photon or electron-photon production of Mo-99 (via $^{235,238}U(\gamma,f)^{99}Mo$ and $^{100}Mo(\gamma,n)^{99}Mo$.

In some embodiments, the one or more contaminants in the target solution of Tc-99m include Mo-98, Mo-99 and/or Mo-100.

Figure 2:
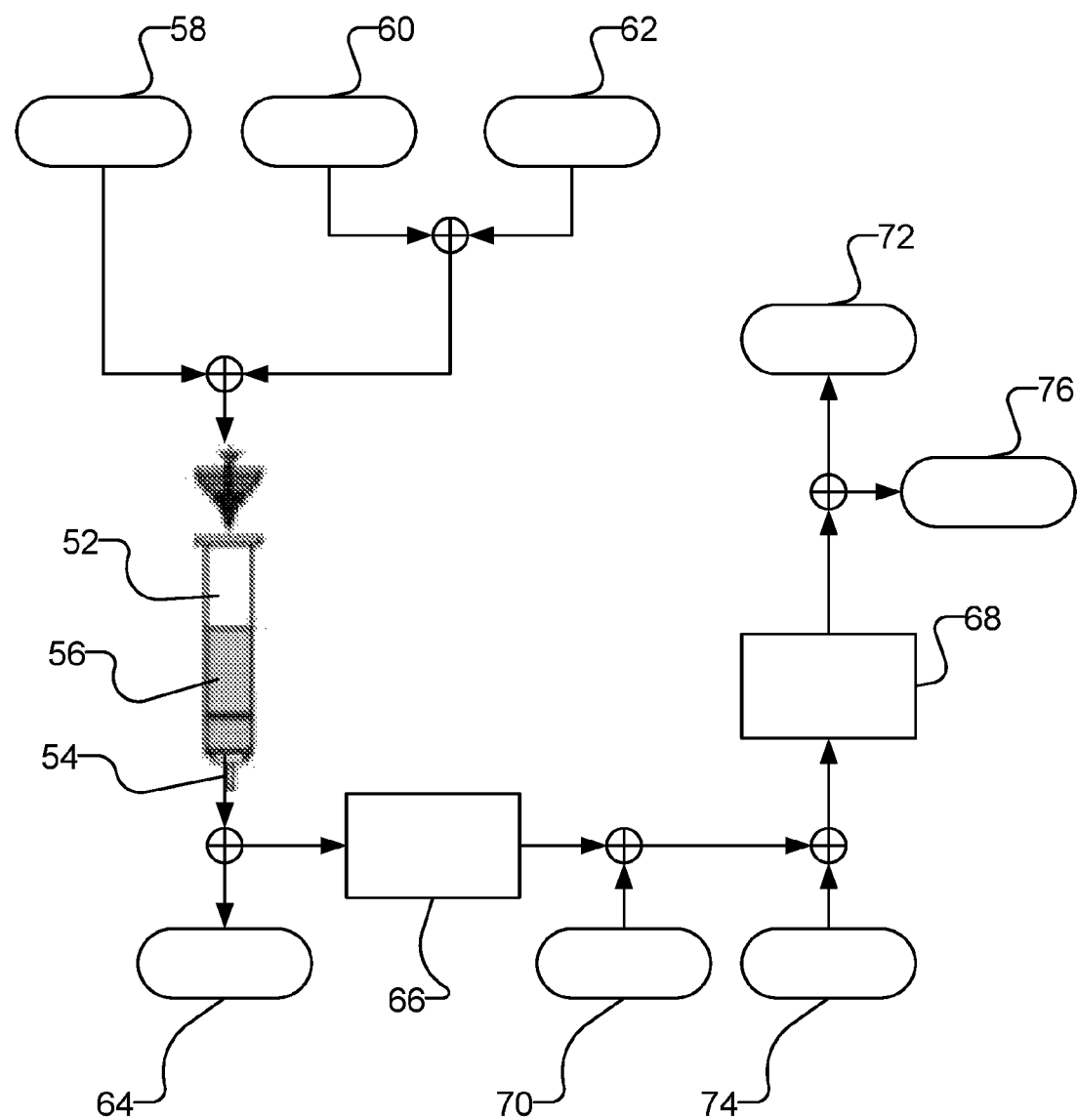
FIG. 2 shows schematically an example embodiment of an apparatus for separating Tc-99m.

With reference to FIG. 2, an example embodiment of an apparatus 50 for purifying Tc-99m from contaminants including Mo-98, Mo-99 or Mo-100 using a packed column is illustrated. Apparatus 50 has a solid phase extraction (SPE) tube, shown schematically at 52, with a Luer adpter 54. SPE tube 52 is packed with a solid support 56 comprising a resin comprising a polyalkyl glycol-based cross-linked polyether polymer resin. In one example embodiment, SPE tube 52 has a volume of 6 mL. In one example embodiment, SPE tube 52 contains between about 300 mg and about 500 mg of solid support 56 or any value therebetween, e.g. 350 mg, 400 mg, or 450 mg.

In one example embodiment, solid support 56 in SPE tube 52 is pre-conditioned by pre-soaking the solid support in a solution of 4 N NaOH having a pH of about 14 for a period of at least 15 minutes before the target solution 58 is loaded.

A target solution 58 comprising Tc-99m and one or more contaminants is provided. In one example embodiment, the target solution comprises the product of dissolution of an irradiated target plate comprising molybdenum using hydrogen peroxide. In one example embodiment, the target solution is prepared for loading by addition of 10 M NaOH so that the resultant target solution is in 4 M NaOH.

In one example embodiment, the target solution 58 is loaded onto SPE tube 52 in a volume of 5 to 20 mL at a flow rate of 0.5 mL/min to 4.0 mL/min or any value therebetween, e.g. 0.75, 1.0, 1.25, 1.5, 1.75, 2.0, 2.25, 2.5, 2.75, 3.0, 3.25, 3.5 or 3.75 mL/min. In one example embodiment, the target solution 58 is loaded onto SPE tube 52 at room temperature. In one example embodiment, the target solution 58 is loaded onto SPE tube 52 at a constant flow rate and is therefore under a constant pressure.

A wash solution 60 comprising NaOH is provided. In one example embodiment, SPE tube 52 is washed with 2-5 mL of 2-4 N NaOH having a pH of approximately 14. A supply of water 62 for elution of Tc-99m from SPE tube 52 is provided. In one example embodiment, SPE tube 52 is washed at a flow rate of 0.5 mL/min to 4.0 mL/min or any value therebetween, e.g. 0.75, 1.0, 1.25, 1.5, 1.75, 2.0, 2.25, 2.5, 2.75, 3.0, 3.25, 3.5 or 3.75 mL/min. In one example embodiment, SPE tube 52 is washed at a constant flow rate and is therefore under a constant pressure.

During loading and washing of solid support 56, the resultant solution containing contaminants such as molybdenum is removed as waste 64. After solid support 56 has been washed, the Tc-99m is eluted, for example with water 62. In one example embodiment, Tc-99m is eluted from solid support 56 using distilled water at a flow rate in the range of 0.5 mL/min to 4.0 mL/min or any value therebetween, e.g. 0.75, 1.0, 1.25, 1.5, 1.75, 2.0, 2.25, 2.5, 2.75, 3.0, 3.25, 3.5 or 3.75 mL/min. In one example embodiment, the Tc-99m is eluted from solid support 56 at a constant flow rate and is therefore under constant pressure. In some embodiments, the distilled water has a pH in the range of 5.5 to 7.

After elution from solid support 56, the resulting aqueous solution including Tc-99m is passed to a strong cation exchange resin, shown schematically at 66. The Tc-99m passes through the strong cation exchange resin 66 and is loaded on an alumina cartridge, shown schematically at 68. Water 70 is provided for loading the Tc-99m on alumina cartridge 68. Tc-99m and any remaining molybdenum are trapped with near quantitative efficiency on alumina cartridge 68, while the solution 72 passing through alumina cartridge 68 is directed to waste. In some embodiments, alumina cartridge 68 comprises a 1.85 g Sep-Pak acidic alumina column.

Saline solution 74 is provided for selectively eluting Tc-99m while molybdenum remains trapped on alumina cartridge 68. The resulting Tc-99m solution product 76 in aqueous saline solution is obtained as the eluate from alumina cartridge 68. In some embodiments, saline solution 74 comprises 0.9% w/v NaCl in sterile water.

Figure 3:
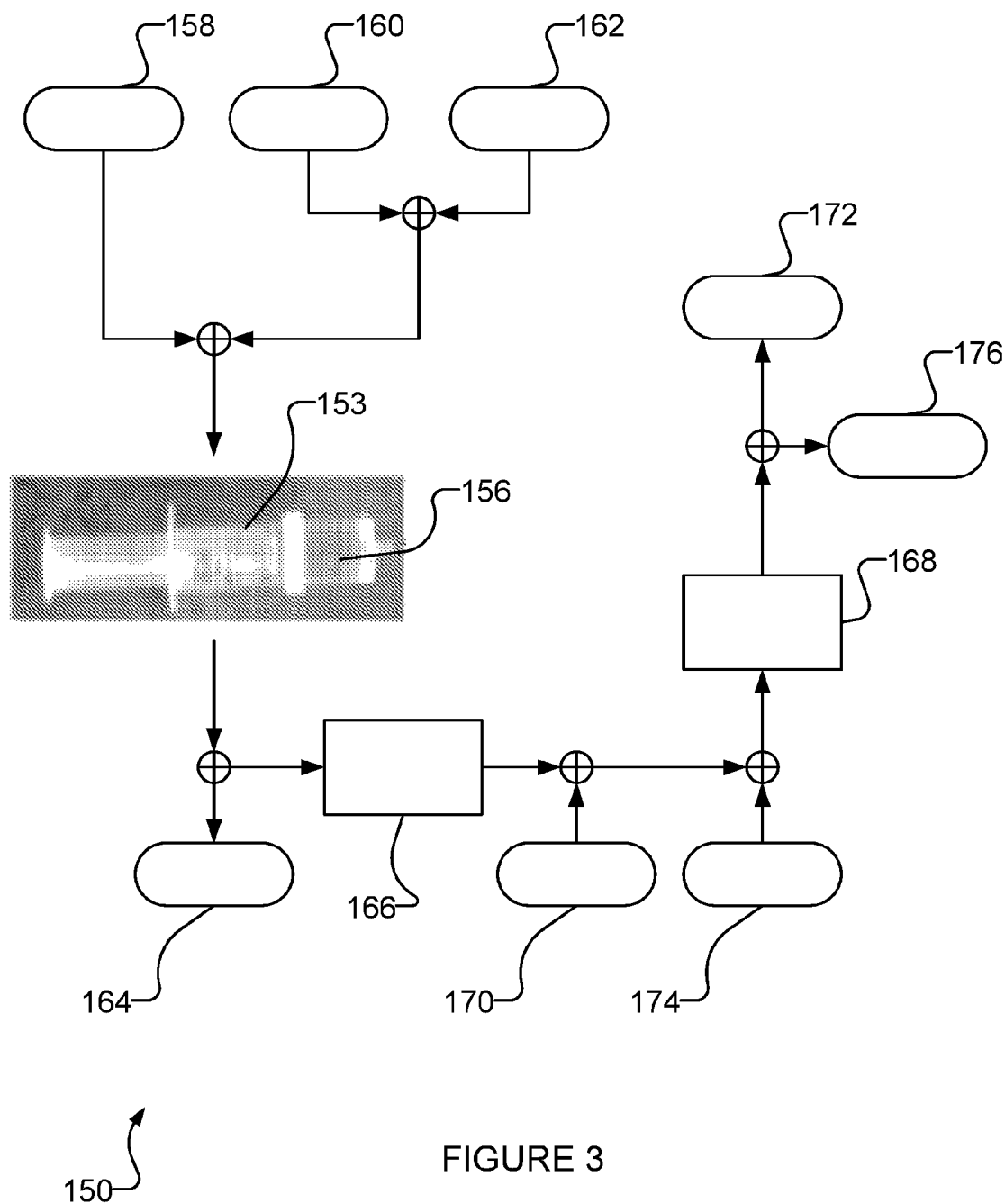
FIG. 3 shows schematically an example embodiment of an apparatus for separating Tc-99m.

With reference to FIG. 3, a second example embodiment of an apparatus 150 for purifying Tc-99m from contaminants including Mo-98, Mo-99 or Mo-100 is illustrated. Apparatus 150 is generally similar to apparatus 50, and elements of apparatus 150 that perform the same function as elements of apparatus 50 are illustrated with reference numerals incremented by 100. The function of these elements is not repeated again.

Apparatus 150 differs from apparatus 50 in that solid phase extraction tube 52 is replaced by a fritted syringe 153. Fritted syringe 153 contains solid support 156 comprising a resin comprising a polyalkyl glycol-based cross-linked polyether polymer. In one example embodiment, fritted syringe 153 has a volume of 20 mL and is filled with between about 300 and about 500 mg of solid support 156, or any value therebetween e.g. 350, 400 or 450 mg. In operation, target solution 158 comprising Tc-99m and one or more contaminants is loaded into fritted syringe 153 by drawing a volume of approximately 20 mL of target solution 158 into fritted syringe 153. After target solution 158 has been loaded, the target solution is optionally mixed with solid support 156 to facilitate association of the Tc-99m with the solid support 156. Excess liquid is ejected from fritted syringe 153 to waste 164. Solid support 156 is then washed by drawing a wash solution 160 into fritted syringe 153, mixing the contents of fritted syringe 153, and ejecting the wash solution to waste 164. In one example embodiment, the washing step is repeated at least two times or at least three times. In one example embodiment, the solution used for washing comprises 2-4N NaOH. In one example embodiment, the volume of solution drawn into fritted syringe 153 to wash solid support 156 in each washing step is approximately 2 mL.

After solid support 156 has been washed, water 162 is drawn into fritted syringe 153 to elute the bound Tc-99m. In one example embodiment, the volume of water 162 drawn into fritted syringe 153 to elute the bound Tc-99m is approximately 10 mL to 20 mL. The water together with eluted Tc-99m are ejected from fritted syringe 153 and passed to strong cation exchange resin 166 for further processing in a similar manner to apparatus 50.

Figure 4:
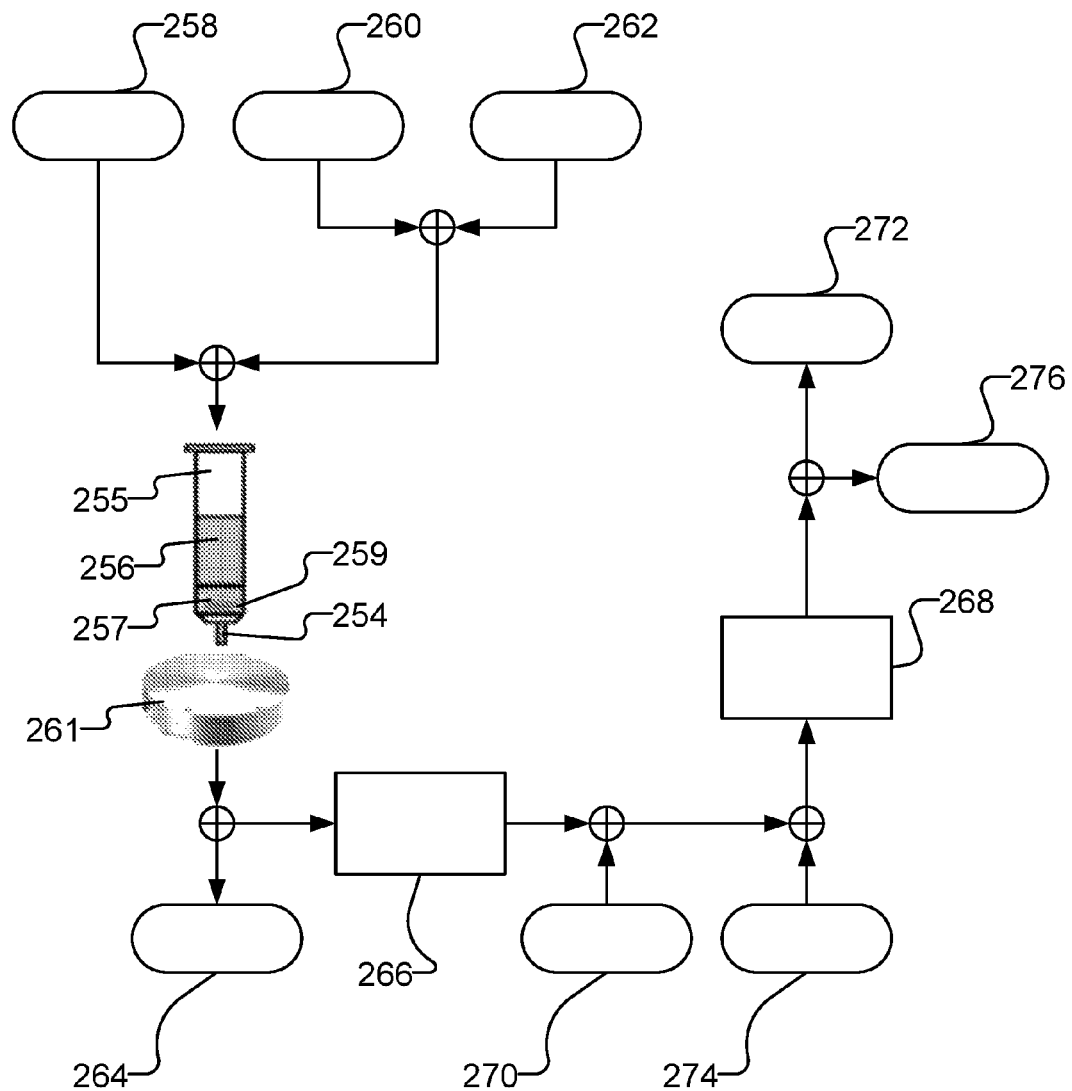
FIG. 4 shows schematically an example embodiment of an apparatus for separating Tc-99m.

With reference to FIG. 4, a third example embodiment of an apparatus 250 for purifying Tc-99m from contaminants including Mo-98, Mo-99 or Mo-100 is illustrated. Apparatus 250 is generally similar to apparatus 50, and elements of apparatus 250 that perform the same function as elements of apparatus 50 are illustrated with reference numerals incremented by 200. The function of these elements is not repeated again.

Apparatus 250 differs from apparatus 50 in that packed solid phase extraction tube 52 is replaced by a larger open-top solid phase extraction (SPE) tube 255 containing a solution containing solid support 256 comprising a polyalkyl glycol-based cross-linked polyether polymer and a magnetic stir bar 257 above frit 259. In one example embodiment, solid phase extraction tube 255 has a volume in the range of 20-60 mL. In some example embodiments, instead of a larger open-top solid phase extraction tube 255, a Whatman disposable filter funnel (1922-1820) is used. A compact magnetic stirrer 261 is provided to rotate magnetic stir bar 257 to thereby stir the solution containing solid support 256. An example of a compact magnetic stirrer suitable for use in some embodiments is a Cimarec™ micro stirrer available from Thermo Scientific.

In use, a target solution 258 comprising Tc-99m and one or more contaminants is provided in any suitable manner and is loaded into solid phase extraction tube 255. In one example embodiment, the volume of target solution 258 is in the range of 20 to 60 mL. In some embodiments, target solution 258 is loaded into solid phase extraction tube 255 by a rapid dispensing pump. Target solution 258 is stirred together with solid support 256 by magnetic stirrer 261 and stir bar 257 under conditions that promote interaction of Tc-99m with solid support 256, e.g. basic conditions such as 2-4 N NaOH. Excess solution is then drained to waste 264, and wash solution 260 comprising 2-4N NaOH is loaded into solid phase extraction tube 255. In one example embodiment, solid support 256 is washed one, two or three times successively with 2 to 5 mL of 2-4N NaOH to remove contaminants while the Tc-99m remains associated with solid support 256. Excess wash solution is drained from solid phase extraction tube 255 and passed to waste 264. Water 262 is then used to elute Tc-99m from solid support 256, and the eluate is passed to strong cation exchange resin 266 for further processing in a manner similar to apparatus 50.

One example embodiment provides a novel method for the isolation of Tc-99m radioisotope (in the form of its pertechnetate salt, $^{99m}TcO_4^-$) from aqueous solutions containing radioactive and non-radioactive molybdenum isotopes (typically present as the molybdate salt, $MoO_4^{2-}$, or polymolybdate salt), the method comprising the following steps:

a) Provide a proton-beam irradiated enriched $^{100}Mo$ target comprising non-radioactive $^{100}Mo$ as well as the irradiation product radionuclide $^{99}Mo$ and its decay product (daughter) radionuclide $^{99m}Tc$. In one embodiment, the irradiation of $^{100}Mo$ targets to produce $^{99m}Tc$ may be accomplished using a TR19 cyclotron (18 MeV protons for one hour at 20 µA). The transformation for this process used in this example embodiment to produce $^{99m}Tc$ is summarized by the equation $^{100}Mo(p,2n)^{99m}Tc$.

b) Dissolve the irradiated Mo target to produce an alkaline solution consisting of a mixture of ionic radioactive and non-radioactive Mo salts as well as the Tc-99m radioisotope (in the form of its pertechnetate salt, $^{99m}TcO_4^-$). The Mo target is dissolved in hydrogen peroxide ($H_2O_2$) then aqueous NaOH (10 M) is added slowly to produce a final concentration of 4 M NaOH.

c) Pre-condition ChemMatrix® resin. ChemMatrix® resins (sourced and/or prepared as described herein) are presoaked/pre-conditioned with 4M NaOH solution for a period of 15 minutes.

d) Package a pre-measured quantity of ChemMatrix® resin in container appropriate for solid (2-phase)/liquid extraction. In one embodiment the container is a solid phase extraction (SPE) cartridge fitted with Luer-type connectors and the quantity of ChemMatrix® resin is in the range of 200-600 mg.

e) Load the $^{99m}TcO_4^-$ onto the ChemMatrix® resin. An aliquot of the alkaline solution, or the entire solution (containing $^{99m}Tc$ and Mo ionic species), according to step b) above, is loaded onto the ChemMatrix® resin and allowed to elute (flow-through) the resin bed at a predetermined flow rate. In one embodiment of the invention, the volume of alkaline solution contained in the aliquot is 5 ml and the flow rate through the resin is in the range of 0.5-2 mL/min. $^{99m}TcO_4^-$ is retained on the resin matrix while Mo-containing ionic species flow through the resin bed and are channelled to either waste or recovery receptacles.

f) Residual Mo-containing species associated with the ChemMatrix® resin are selectively removed. ChemMatrix® resin (with bound $^{99m}TcO_4^-$) is rinsed with NaOH solution and the wash (containing any residual Mo species) channelled either to waste or to receptacles for recovery of Mo while $^{99m}TcO_4^-$ is quantitatively retained on the resin. In a preferred embodiment the concentration of the NaOH solution is 4 M.

g) Elute $^{99m}TcO_4^-$ from the ChemMatrix® resin using water. In one embodiment of the invention, $^{99m}TcO_4^-$ is quantitatively released from the ChemMatrix® resin and eluted from the column using water at a flow rate of 1-4 ml/min.

h) Remove any potential residual Na from and neutralize the pH of the aqueous $^{99m}TcO_4^-$ solution. In one embodiment of the invention, the $^{99m}TcO_4^-$ solution is passed through or contacted with a strong cation-exchange resin. The solution containing $^{99m}TcO_4^-$ is collected after passing through the cation-exchange resin for further processing.

i) $^{99m}TcO_4^-$ is quantitatively absorbed onto an alumina substrate/matrix. In one embodiment of the invention, the neutralized aqueous $^{99m}TcO_4^-$ solution from step h) above is passed through a Waters alumina A Sep-Pak® cartridge to quantitatively retain the $^{99m}TcO_4^-$ and any remaining traces of molybdate ($^{100}$Mo or $^{99}$Mo) ionic species.

j) Obtain $^{99m}TcO_4^-$ from the alumina matrix for subsequent use in downstream procedures. In one embodiment, the $^{99m}TcO_4^-$ can be quantitatively eluted from the alumina A Sep-Pak cartridge using a solution of physiological saline (0.9% NaCl). Using this method, any residual Mo-containing ionic species remain associated with the alumina matrix.

In one example embodiment of the invention, the ChemMatrix® resin is Mesyl-modified ChemMatrix®, the resin amount used is 500 mg, the flow rate for loading alkaline solution onto the resin is 2 ml/min, and the flow rate for eluting $^{99m}TcO_4^-$ from the resin using water is 2 ml/min. In this example embodiment of the invention, the recovery of $^{99m}TcO_4^-$ from the initial quantity loaded on the Mesyl-modified ChemMatrix® resin is typically greater than 99% and no traces of Mo are detected in the final product $^{99m}TcO_4^-$ eluted with saline from the alumina A column.

In alternative embodiments of the invention, the experimental setup or apparatus used to effect isolation of $^{99m}TcO_4^-$ from alkaline Mo-containing solutions may adopt any one of several possible process configurations and designs, all of which are within the scope of some embodiments of the current invention.

In another embodiment of the invention, the methods for $^{99m}TcO_4^-$ isolation described herein may be used as part of an overall process to prepare Tc-99m from medical cyclotrons.

In yet another embodiment of the invention, the methods for $^{99m}TcO_4^-$ isolation described herein may be used as part of an overall process to prepare Tc-99m using a generator employing low-specific activity $^{99}$Mo.

In another embodiment of the invention, the methods for $^{99m}TcO_4^-$ isolation described herein may be used as part of an overall process to prepare Tc-99m using a generator employing low-specific activity $^{99}$Mo produced in linear accelerators.

In another embodiment of the invention, the methods for isolation of $TcO_4^-$ described herein may be used as a part of an overall process to prepare Tc-94m from medical cyclotrons.

EXAMPLES

Example embodiments of the invention are further described with reference to the following examples, which are meant to be illustrative and not limiting in nature.

Example 1.0—Materials and Methods

Example 1.1—Preparation of Alkaline Solutions of Mo Containing $^{99m}TcO_4^-$

For each experiment with each ChemMatrix® resin type, 2 g of molybdenum metal was dissolved in 20 ml of hydrogen peroxide to simulate the dissolution of a molybdenum metal target plate. Approximately 5 ml of the hydrogen peroxide volume evaporates during this process. 10 ml of 10M NaOH was slowly added to reach a final solution concentration of 4M NaOH. A solution of 4M NaOH has a pH of approximately 14. The hydrogen peroxide is highly reactive when in contact with molybdenum and sodium hydroxide, and the reaction is exothermic. The initial yellowish colour of the molybdenum solution becomes clear as the solution becomes alkaline. Pure Tc-99m pertechnetate tracer was added to this solution to reproduce the conditions encountered after target irradiation and dissolution.

Example 1.2—Pre-Conditioning ChemMatrix® Resins

In some experiments ChemMatrix® resins were preconditioned with water, where swelling was immediately noticeable, followed by the addition of 4M NaOH over a period of not less than 15 minutes. In the alkaline solution, there is an immediate and obvious reduction in the volume of the resin bed.

The resin was packaged in solid phase extraction cartridge attached with Luer-type connectors, omitting the top frit—practical experiments quickly revealed that the swelling of the resin can obstruct flow if the resin is compacted between two frits, and sufficient head space is necessary for resin expansion.

In later experiments, ChemMatrix® resins were preconditioned directly with 4M NaOH over a period of not less than 15 minutes, without preconditioning in water, with equivalent results. Proper packing of the resin after conditioning by 4 M NaOH was ensured to reduce variability of the results and improve trapping.

Example 2.0—Isolation of $^{99m}TcO_4^-$ from Alkaline Solutions of Proton-Irradiated $^{100}$Mo Targets Using Aminomethyl ChemMatrix® Resin Example 2.1—Aminomethyl ChemMatrix® Resin The aminomethyl-ChemMatrix® resin was purchased from PCAS Biomatrix (product number 7-111-1310), St-Jean-sur-Richelieu, Quebec, Canada. Aminomethyl-ChemMatrix® has the general chemical structure 1 set forth above.

Example 2.2—Isolation Procedure and Conditions

Following the conditioning step, the quantity of resin was varied between 300 and 600 mg. The Tc-99m/molybdenum alkaline solution (5 ml of the stock solution described above) was loaded in subsequent experiments at flow rates of 0.5, 1 and 2 ml/min, with careful measurement of the fate of radioactivity. The molybdenum solution flowed through the resin, while the Tc-99m was selectively retained.

Quantitative trapping (95-100% trapping efficiency) was achieved at 0.5 ml/min using 300 mg of resin, and 2 ml/min using 600 mg of resin. The resin was rinsed with 2-4 ml of 4 M NaOH to remove any residual molybdenum present on the resin. This step did not elute significant quantities of Tc-99m. The Tc-99m was then eluted with water at flow rates ranging from 1 to 4 ml/min. In water, the Tc-99m is quickly released from the resin. For further processing and purification in a suitable form for clinical use, the aqueous Tc-99m solution is passed through a strong cation exchange resin to neutralize the pH and remove any potential residual sodium, then an alumina A Sep-Pak® cartridge, on which Tc-99m and remaining traces of molybdenum and Mo-99 are retained. Tc-99m is not retained in the cation exchange cartridge, and trapping efficiency on alumina is virtually quantitative. Tc-99m can be readily eluted with 0.9% w/v (154 mM) sodium chloride, while any residual molybdenum remains trapped on the alumina cartridge.

Under the tested conditions, the optimal conditions using 300 mg of resin were obtained with a loading flow rate of 0.5 ml/min and an elution flow rate of 2 ml/min. The optimal conditions using 600 mg of resin were obtained with a loading flow rate of 2 ml/min and an elution flow rate of 1 ml/min. In both cases, some losses occurred either due to incomplete trapping or incomplete release of Tc-99m. Despite this, respectable separation yields of over 85% were achieved routinely.

The inventors noted that the Tc-99m was partially retained on the aminomethyl-ChemMatrix® resin. Without being bound by theory, it is postulated that this may be due to non-specific charge interactions as the pH of the resin is lowered (the Tc-99m pertechnetate is negatively charged, while in slightly acidic water, such as water for injection or deionized water, the pH is typically around 5, possibly leading to a positive charge at free amine groups on the aminomethyl-ChemMatrix® resin). Other possibilities include non-specific adsorption within the core physical makeup of the resin and/or diffusion into dead zones within the column packing.

Example 3.0—Isolation of $^{99m}TcO_4^-$ from Alkaline Solutions of Proton-Irradiated $^{100}Mo$ Targets Using Acetyl-Modified ChemMatrix® Resin Example 3.1—Preparation of Acetyl-Modified ChemMatrix® Resin The acetyl-modified ChemMatrix® resin having structure (2) was prepared by incubating aminomethyl-ChemMatrix® resin (1.68 g) with 10 equivalents of acetic anhydride and 10 equivalents of N,N-diisopropylethylamine in methylene chloride (30 mL) at room temperature for 48 hours, then recovered by filtration, washed (N-methylpyrrolidinone 20 mL×2, methanol 20 mL×2, N-methylpyrrolidinone 20 mL×2, methylene chloride 20 mL×3, and methanol 20 mL×3), and dried under vacuum prior to further use.

Example 3.2—Isolation Procedure and Conditions 5 ml of a stock solution of molybdenum and Tc-99m was loaded on the acetyl-modified ChemMatrix® resin (500 mg) using a flow rate of 2 ml/min. 100% trapping was immediately noticed, with no loss of Tc-99m in the waste vial. The Tc-99m was completely released with water at a flow of 1 ml/min, with over 96% recovery of the Tc99m in the final product vial.

Example 4.0—Isolation of $^{99m}TcO_4^-$ from Alkaline Solutions of Proton-Irradiated $^{100}Mo$ Targets Using Mesyl-Modified ChemMatrix® Resin Example 4.1—Preparation of Mesyl-ChemMatrix® Resin The mesyl-modified ChemMatrix® resin having structure (3) was synthesized by incubating the aminomethyl-ChemMatrix® resin (2.0 g) with 5 equivalents of methanesulfonyl chloride and 5 equivalents of N,N-diisopropylethylamine in methylene chloride (60 mL) at room temperature for 4 days, recovered by filtration, washed (N-methylpyrrolidinone 20 mL×2, methanol 20 mL×2, N-methylpyrrolidinone 20 mL×2, methylene chloride 20 mL×3, and methanol 20 mL×3), and dried under vacuum prior to further use.

Example 4.2—Isolation Procedure and Conditions 5 ml of a stock solution of molybdenum and Tc-99m was loaded on the mesyl-modified ChemMatrix® resin (500 mg) using a flow rate of 2 ml/min. 100% trapping was immediately noticed, with no loss of Tc-99m in the waste vial. The Tc-99m was completely released with water at a flow of 2 ml/min, with over 99% recovery of the Tc-99m. After recovery of Tc-99m from the resin, only 1-5 mg/L of molybdenum were detected by a colourimetric molybdenum detection kit. This solution was then neutralized on a cation exchange resin, trapped on an alumina A cartridge, and the final product was eluted with 0.9% saline. No traces of molybdenum were detected in the final product.

Example 5.0—Isolation of $^{99m}TcO_4^-$ from Alkaline Solutions of Proton-Irradiated $^{100}Mo$ Targets Using Pegylated-ChemMatrix® Resin Example 5.1—Preparation of Pegylated-ChemMatrix® Resin The Pegylated-chemMatrix resin having structure (4) was synthesized by incubating the aminomethyl-ChemMatrix® resin (1.5 g) with one equivalent of poly(ethylene glycol) methyl ether tosylate (average molecular weight, 2000) and 2 equivalents of potassium carbonate in acetonitrile (30 mL) under reflux for 6 days. After diluting the reaction mixture with water (30 mL), the Pegylated-ChemMatrix® resin was recovered by filtration, washed (N-methylpyrrolidinone 20 mL×2, methanol 20 mL×2, N-methylpyrrolidinone 20 mL×2, methylene chloride 20 mL×3, and methanol 20 mL×3), and dried under vacuum prior to further use.

Example 5.2—Isolation Procedure and Conditions 5 ml of a stock solution of molybdenum and Tc-99m was loaded on the Pegylated-ChemMatrix® resin (500 mg) using a flow rate of 2 ml/min. 97% trapping was immediately noticed, with some losses of Tc-99m in the waste vial. The Tc-99m was completely released with water at a flow of 2 ml/min, with a final recovery of 95% of the Tc-99m in the final product vial.

Example 6.0—Isolation of $^{99m}TcO_4^-$ from Alkaline Solutions of Proton-Irradiated $^{100}Mo$ Targets Using BOC-ChemMatrix® Resin Example 6.1—Preparation of BOC-ChemMatrix® Resin The BOC-ChemMatrix® resin having structure (5) was synthesized by incubating the aminomethyl-ChemMatrix® resin (2.0 g) with 5 equivalents of di-tert-butyl dicarbonate and 5 equivalents of N,N-diisopropylethylamine in methanol (60 mL) at room temperature for 4 days, recovered by filtration, washed (N-methylpyrrolidinone 20 mL×2, methanol 20 mL×2, N-methylpyrrolidinone 20 mL×2, methylene chloride 20 mL×3, and methanol 20 mL×3), and dried under vacuum prior to further use.

Example 6.2—Isolation Procedure and Conditions 5 ml of a stock solution of molybdenum and Tc-99m was loaded on the BOC-ChemMatrix® resin (500 mg) using a flow rate of 2 ml/min. 100% trapping was immediately noticed, with no loss of Tc-99m in the waste vial. The Tc-99m was completely released with water at a flow of 2 ml/min, with a final recovery of 98.2% of the Tc-99m in the final product vial.

Example 7.0—Isolation of $^{99m}TcO_4^-$ from Alkaline Solutions of Proton-Irradiated $^{100}Mo$ Targets Using Nitrile-ChemMatrix Resin Example 7.1—Preparation of Nitrile-ChemMatrix Resin The nitrile-ChemMatrix® resin was obtained from PCAS Biomatrix (product number A003), St-Jean-sur-Richelieu, Quebec, Canada. nitrile-ChemMatrix® has the general chemical structure (6) set forth above.

Example 7.2—Isolation Procedure and Conditions 5 ml of a stock solution of molybdenum and Tc-99m was loaded on the nitrile-ChemMatrix® resin (500 mg) using a flow rate of 2 ml/min. Trapping was 100%, with no loss of Tc-99m in the waste vial. The Tc-99m was completely released with water at a flow of 2 ml/min, with a final recovery of 100% of the Tc-99m in the final product vial.

Example 8.0—Isolation of $^{99m}TcO_4^-$ from Alkaline Solutions of Proton-Irradiated $^{100}Mo$ Targets Using Wang-ChemMatrix Resin Example 8.1—Wang-ChemMatrix Resin The Wang-ChemMatrix® resin was obtained from PCAS Biomatrix (product number 7-320-1310), St-Jean-sur-Richelieu, Quebec, Canada. Wang-ChemMatrix® has the general chemical structure (47) set forth above.

Example 8.2—Isolation Procedure and Conditions 5 ml of a stock solution of molybdenum and Tc-99m was loaded on the Wang-ChemMatrix® resin (500 mg) using a flow rate of 2 ml/min. Trapping was 100%, with no loss of Tc-99m in the waste vial. The Tc-99m was completely released with water at a flow of 2 ml/min, with a final recovery of 100% of the Tc-99m in the final product vial.

Example 9.0—Results

The recovery efficiency for isolation of $^{99m}TcO_4^-$ from alkaline solutions of dissolved Mo was assessed for 7 different ChemMatrix® resin types under different experimental conditions as outlined above. Parameters that were varied included resin mass, load rate and elution rate. The results are summarized in Table 1 herein.

TABLE 1

Summary of Results for $^{99m}TcO_4^-$ Isolation from Different ChemMatrix ® Resins under Various Experimental Conditions.

| RESIN | Mass (mg) | Load Rate (ml/min) | Elution Rate (ml/min) | Load % | Elution % | Net Yield % |
|---|---|---|---|---|---|---|
| AMINOMETHYL-CHEMMATRIX | 200 | 1 | 1 | 86% | 85% | 73% |
| AMINOMETHYL-CHEMMATRIX | 300 | 0.5 | 0.5 | 100% | 97% | 96% |
| AMINOMETHYL-CHEMMATRIX | 300 | 1 | | 67% | | |
| AMINOMETHYL-CHEMMATRIX | 300 | 0.75 | | 74% | | |
| AMINOMETHYL-CHEMMATRIX | 300 | 1 | 2 | 88% | 96% | 83% |
| AMINOMETHYL-CHEMMATRIX | 300 | 0.75 | 2 | 88% | 97% | 85% |
| AMINOMETHYL-CHEMMATRIX | 300 | 0.5 | 5 | 100% | 94% | 94% |
| AMINOMETHYL-CHEMMATRIX | 600 | 1 | 1 | 100% | 85% | 87% |
| AMINOMETHYL-CHEMMATRIX | 600 | 2 | 10 | 97% | 69% | 69% |
| AMINOMETHYL-CHEMMATRIX | 600 | 2 | 1 | 99% | 77% | 77% |
| ACETYL-CHEMMATRIX | 600 | 2 | 1 | 100% | 95% | 99% |
| ACETYL-CHEMMATRIX | 300 | 2 | 2 | 54% | 100% | 53% |
| ACETYL-CHEMMATRIX | 500 | 2 | 2 | 99% | 98% | 96% |
| PEGYLATED-CHEMMATRIX | 500 | 2 | 2 | 97% | 98% | 95% |
| MESYL-CHEMMATRIX | 500 | 2 | 2 | 100% | 100% | 99.8% |
| MESYL-CHEMMATRIX | 500 | 2 | 2 | 99.6% | 100 | |
| BOC-CHEMMATRIX | 500 | 2 | 2 | 100% | 98% | 98% |
| BOC-CHEMMATRIX | 500 | 2 | 2 | 99.7% | 99.3% | 99% |
| WANG-CHEMMATRIX | 500 | 2 | 2 | 100% | 100% | 100% |
| NITRILE-CHEMMATRIX | 500 | 2 | 2 | 100% | 100% | 100% |

The foregoing results demonstrate that a resin comprising a polyethylene glycol-based cross-linked polyether polymer can be used to achieve efficient recovery of technetium-99m (Tc-99m) from a solution comprising both technetium and molybdenum. In some embodiments, structural modification of the polyethylene glycol-based cross-linked polyether polymer, for example by substituting an acetyl group, a mesyl group, a PEG-group, a BOC-group, or a nitrile group for the amine group present in a commercially available polyethylene glycol-based cross-linked polyether polymer (i.e. aminomethyl ChemMatrix®) can be used to improve recovery of technetium-99m (Tc-99m) from a solution comprising both technetium and molybdenum.

Based on the foregoing experimental results, it can be soundly predicted that other polyalkyl glycol-based cross-linked polyether polymers based on polyalkyl glycols that are chemically similar to polyethylene glycol, such as polypropylene glycol, polytetrahydrofuran, or mixtures of such polyalkyl glycols, can also be used to achieve efficient recovery of technetium-99m (Tc-99m) from a solution comprising technetium and one or more contaminants such as molybdenum. Without being bound by theory, the separation mechanism by which polyalkyl glycol-based ether polymers separate Tc-99m from contaminants such as Mo is based on the thermodynamics of water molecules associating with the compound to be isolated (i.e. pertechnetate). The selective retention and release of pertechnetate is based on the orientation of specific atoms (oxygen) within a flexible molecular framework that creates a biphasic environment around the resin. One skilled in the art would expect other polyalkyl glycols similar to polyethylene glycol (e.g. polypropylene glycol, polytetrahydrofuran, or mixtures of such polyalkyl glycols) would achieve a similar separation effect.

Furthermore, it can be soundly predicted that other chemical modifications of an aminomethyl-based polyalkyl glycol-based polyether polymers other than acetyl, mesyl, PEG, BOC or nitrile can be used to enhance the recovery of technetium-99m (Tc-99m) from a solution comprising both technetium and molybdenum. Without being bound by theory, it is believed that modification of free amine groups on the polyalkyl glycol-based cross-linked polyether polymer avoids adsorption of Tc-99m by such free amine groups, thereby increasing efficiency. In some embodiments, such modifications may also enhance properties of the modified resin, such as maintaining a high degree of compatibility with the high pH, high salt environment utilized to capture the Tc-99m on the resin, followed by efficient release under lower pH and a lower salt environment to release the Tc-99m from the resin.

REFERENCES

The following references pertain to the subject matter described herein. Each of the following references is incorporated by reference in its entirety:

Evans J V, Moore P W, Sying M E, Sodeau J M. Zirconium molybdate gel as a generator for technetium-99m--I. The concept and its evaluation. Int J Rad Appl Instrum A. 1987; 38(1):19-23.

Blower P J. Extending the life of a 99mTc generator: a simple and convenient method for concentrating generator eluate for clinical use. Nucl Med Commun 1993; 14(1):995-9.

Dash A, Knapp F F, Pillai M R A. 99Mo/99mTc separation: An assessment of technology options. Nucl Med Biol 2012; http://dx.doi.org/10.1016/j.nucmedbio.2012.10.005

Rogers R D, Bond A H, Bauer C B. Aqueous biphase systems for liquid/liquid extraction of f-elements utilizing polyethylene glycols. Sep Sci Technol 1993; 28: 139-53.

Huddleston J G, Griffin S T, Zhang J, Willauer H D, Rogers R D. Metal ion separations in aqueous biphasic systems and with ABEC resins. Methods in Biotechnology 2000; 11:77-94.

Rogers R D, Bond A H, Bauer C B, Zhang J, Rein S D, Chomko R R, et al. Partitioning behavior of 99Tc and 129I from simulated Hanford tank wastes using polyethylene glycol-based aqueous biphasic systems. Solvent Extr Ion Exch 1995; 13:689-713.

Rogers R D, Zhang J, Bond A H, Bauer C B, Jezl M L, Roden D M. Selective and quantitative partitioning of pertechnetate in polyethylene glycol-based aqueous biphasic systems. Solvent Extr Ion Exch 1995; 13:665-88.

Rogers R D, Bond A, Zhang J, Horwitz E. New technetium-99m generator technologies utilizing polyethylene glycol-based aqueous biphasic systems, Symposium on Separation Science and Technology for Energy Applications No 9. Gatlinburg, Tenn., 1997; 32(1-4); 1997. p. 867-82.

Rogers R D, Bond A H, Griffin S T, Horwitz E P. New technologies for metal Ion separations: aqueous biphasic extraction chromatography (ABEC). Part I. uptake of pertechnetate. Solvent Extr Ion Exch 1996; 14:919-46.

Rogers R D, Bond A H, Zhang J, Bauer C B. Polyethylene glycol based-aqueous biphasic systems as technetium-99m generators. Appl Radiat Isot 1996; 47(5-6): 497-9.

Rogers R D, Zhang J. Effects of increasing polymer hydrophobicity on distributionratios of TcO4—in polyethylene/polypropylene glycol-based aqueous biphasic systems. J Chromatogr B Biomed Appl 1996; 680:231-6.

Rogers R D, Bond A H, Zhang J, Horwitz E P. New technetium-99m generator technologies utilizing polyethylene glycol-based aqueous biphasic systems. Sep Sci Technol 1997; 32:867-82.

Rogers R D, Zhang J, Griffin S T. The effects of halide anions on the partitioning behavior of pertechnetate in polyethylene glycol-based aqueous biphasic systems. Sep Sci Technol 1997; 32:699-707.

García-Martín F, Quintanar-Audelo M, Garcia-Ramos Y, Cruz L J, Gravel C, Furic R, Côté S, Tulla-Puche J, and Albericio F. ChemMatrix, a Poly(ethylene glycol)-Based Support for the Solid-Phase Synthesis of Complex Peptides. J. Comb. Chem., 2006, 8 (2), pp 213-220

ChemMatrix® for complex peptides and combinatorial chemistry. García-Ramos Y, Paradís-Bas M, Tulla-Puche J, Albericio F. J Pept Sci. 2010 December; 16(12):675-8. doi: 10.1002/psc.1282.

U.S. Pat. No. 7,235,297
U.S. Pat. No. 7,842,767
U.S. Pat. No. 5,603,834

What is claimed is:

1. A method of separating technetium-99m (Tc-99m) from one or more contaminants comprising:
    obtaining a target solution comprising technetium-99m (Tc-99m) and one or more contaminants;
    loading the target solution on a solid support consisting of a polyalkyl glycol-based cross-linked polyether polymer under conditions favouring interaction of the technetium-99m (Tc-99m) with the solid support;
    washing the solid support under conditions favouring interaction of the technetium-99m (Tc-99m) with the solid support; and
    eluting the technetium-99m (Tc-99m) from the solid support with an elution solution under conditions promoting release of the technetium-99m (Tc-99m) from the solid support.

2. A method as defined in claim 1, wherein the solid support comprises a cross-linked polyether which is obtained by polymerizing a monomer of the general formula:

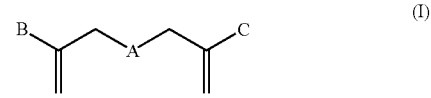

(I)

wherein A is a polyalkyl glycol and B and C are independently electron-withdrawing groups.

3. A method as defined in claim 2, wherein the polyalkyl glycol comprises polyethylene glycol (PEG), polypropylene glycol (PPG), polytetrahydrofuran (poly(THF)), or a combination thereof, and wherein the electron-withdrawing groups B and C independently comprise cyano, ester, amide, formyl, halogen, nitro, sulfoxide, or ketone.

4. A method as defined in claim 1, wherein the solid support comprises a cross-linked polyether which is obtained by copolymerization of at least one monomer comprising (a) a one-ended polymerizable vinyl or allyl ketone, ester, ether or mixtures thereof with at least one cross-linker having at least two polymerizable terminal end groups, with the exception of epoxy and oxetane end groups, or (b) divinyl benzene; wherein the solid support is obtained by copolymerizing at least one monomer derivative of an acrylic, methacrylic, maleic and/or itaconic acid with (a) at least one cross-linker having at least two polymerizable terminal end groups, with the exception of epoxy and oxetane end groups, or (b) divinyl benzene to produce a cross-linked polyester; and wherein the cross-linked polyester is reduced to give a cross-linked polyol resin, and the cross-linked polyol resin is reacted with a cyclic ether or a cyclic amine to yield the cross-linked polyether solid support.

5. A method as defined in claim 1, wherein the solid support comprises a polyethylene glycol-based cross-linked polyether polymer having the general formula (1), (2), (3), (4), (5), (6) (7), (8), (9), (10), (11), (12), (13), (14), (15), (16), (17), (18), (19), (20), (21), (22), (23), (24), (25), (26), (27), (28), (29), (30), (31), (32), (33), (34), (35), (36), (37), (38), (39), (40), (41), (42), (43), (44), (45), (46) or (47) set forth below, wherein R' and R" can independently be alkyl, aryl or hydrogen, wherein n is an integer between 1 and 1000, and wherein m is an integer between 1 and 1000:

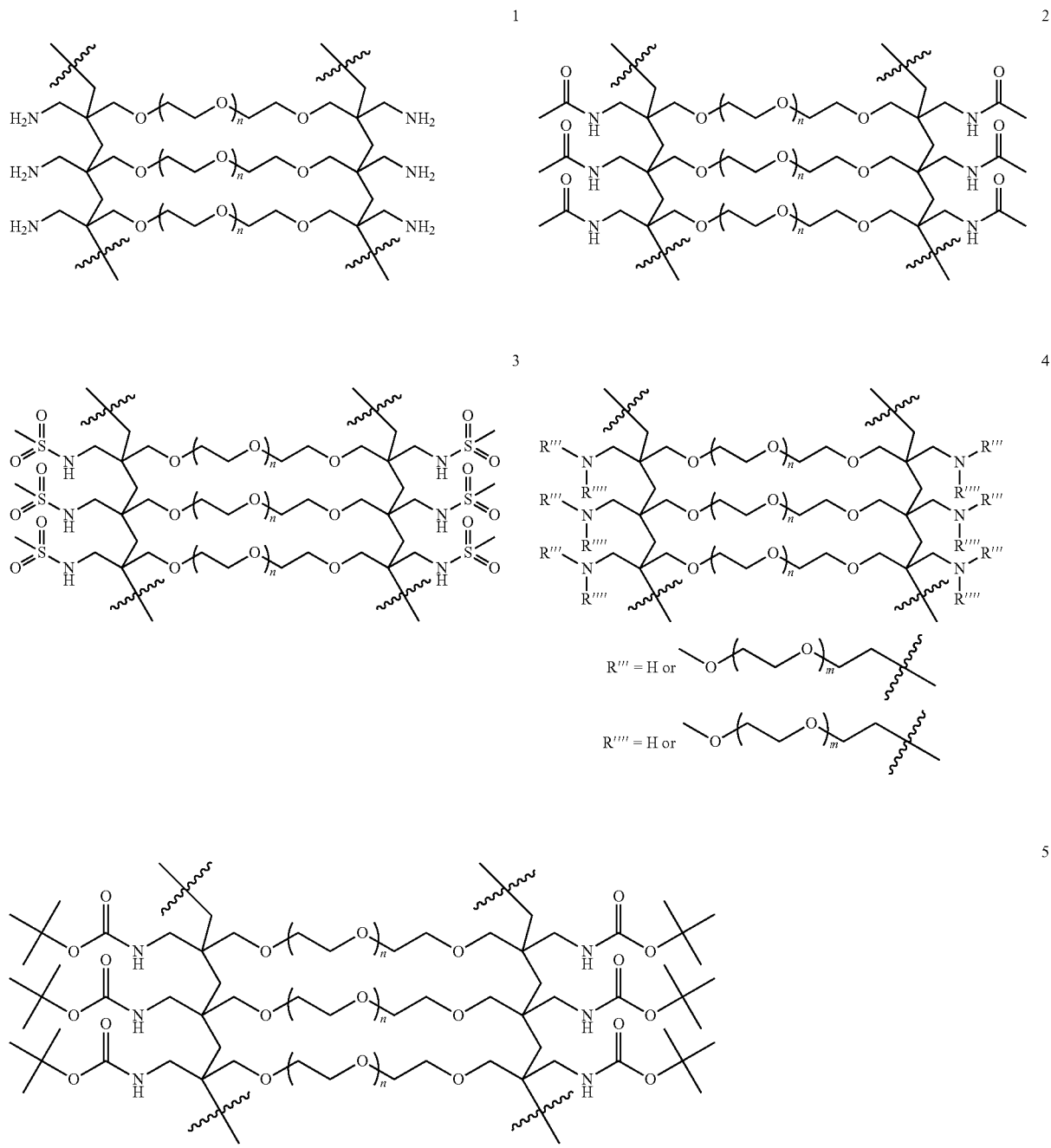

-continued
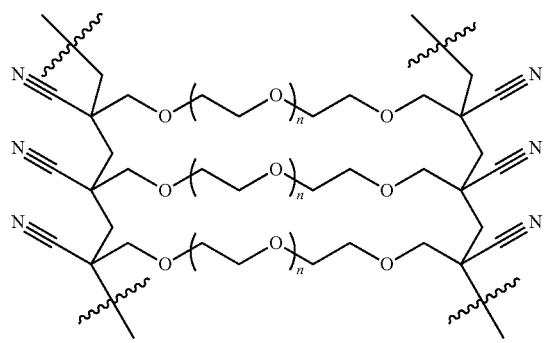
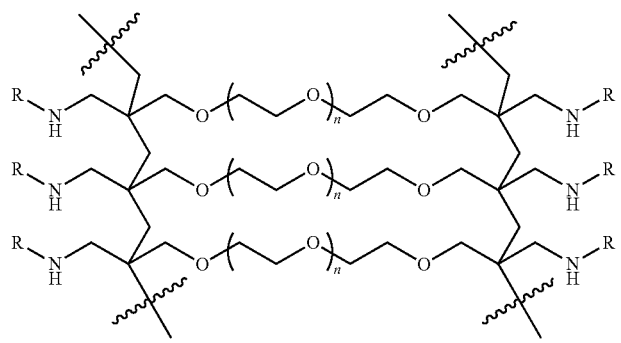
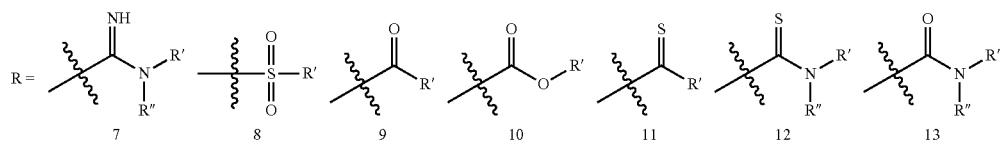
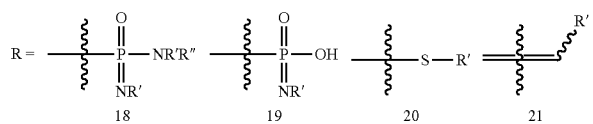
14 - R = alkyl
15 - R = aryl
16 - R = alkenyl
17 - R = alkynyl
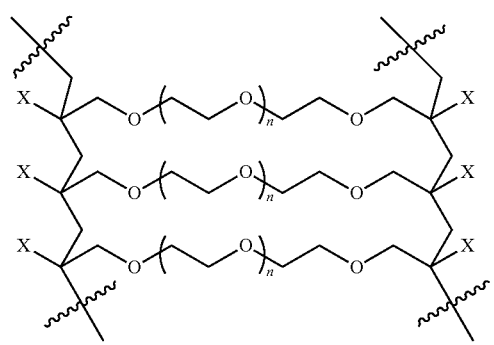

-continued
22 - X = CH₃
23 - X = NO₂
24 - X = CH₂OH
25 - X = CH₂SH
26 - X = CH₂NR'R''
27 - X = CH₂PR'R''
28 - X = alkane
29 - X = alkene
30 - X = alkyne
31 - X = arene
32 - X = OR'
33 - X = C(O)OR'
34 - X = COOH
35 - X = C(O)NR'R''
36 - X = C(S)NR'R''
37 - X = Cl
38 - X = F
39 - X = Br
40 - X = I
41 - X = SO₃
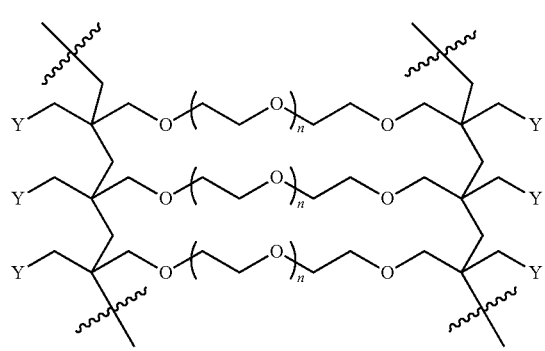
Y =
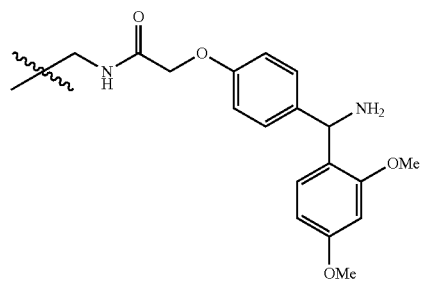
42
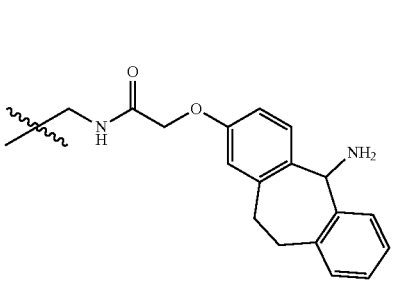
43
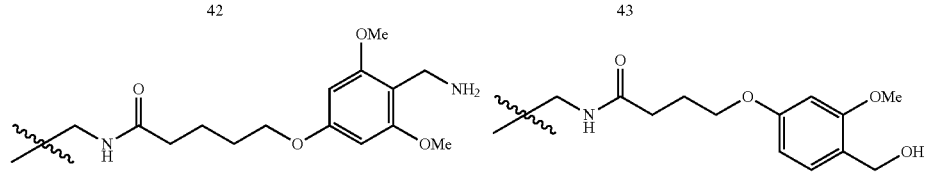
44
45
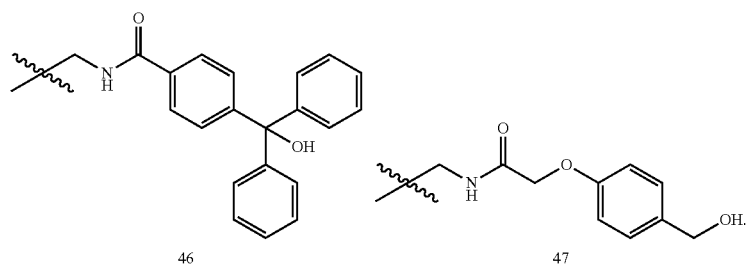
46
47

6. A method as defined in claim 1, wherein the solid support comprises a polyalkyl glycol-based cross-linked polyether polymer having the general formula (48) below

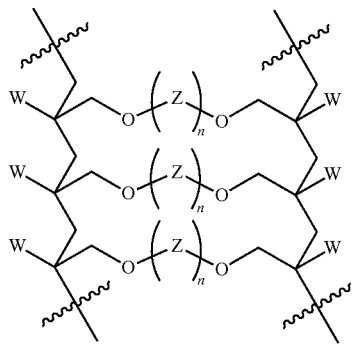

48 wherein Z is an alkyl group and W is: (a) any one of the structures specified for X in structures (22), (23), (24), (25), (26), (27), (28), (29), (30), (31), (32), (33), (34), (35), (36), (37), (38), (39), (40), or (41)

| | |
|---|---|
| X =CH$_3$ | 22— |
| X=NO$_2$ | 23— |
| X=CH$_2$OH | 24— |
| X=CH$_2$SH | 25— |
| X=CH$_2$NR'R" | 26— |
| X=CH$_2$PR'R" | 27— |
| X=alkane | 28— |
| X=alkene | 29— |
| X=alkane | 30— |
| X=arene | 31— |
| X=OR' | 32— |
| X=C(O)OR' | 33— |
| X=COOH | 34— |
| X=C(O)NR'R" | 35— |
| X=C(S)NR'R" | 36— |
| X=Cl | 37— |
| X=F | 38— |
| X=Br | 39— |
| X=I | 40— |
| X=SO$_3$ | 41— |

(b) —CH$_2$—NH—R, where R is any one of the structures specified for R in structures (7), (8), (9), (10), (11), (12), (13), (14), (15), (16), (17), (18), (19), (20), or (21)

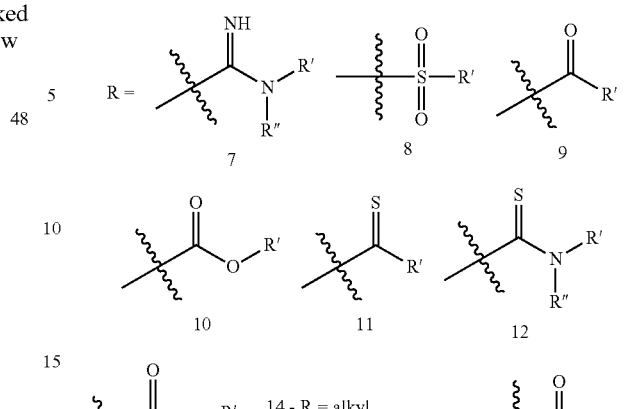

(c) —CH$_2$—Y, where Y is any one of the structures specified for Y in structures (42), (43), (44), (45), (46) or (47)

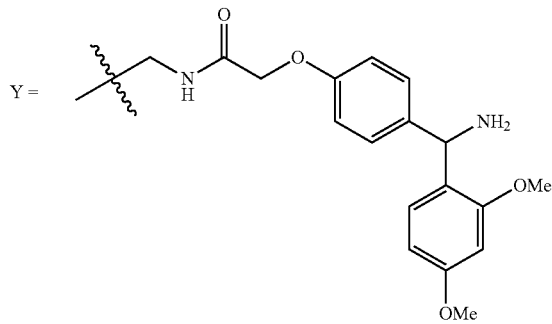

42

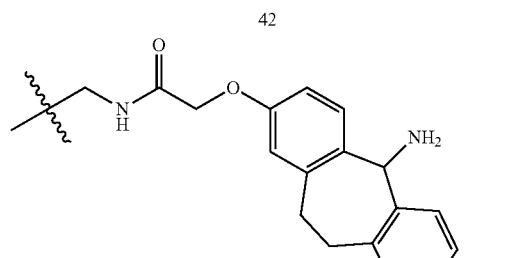

43

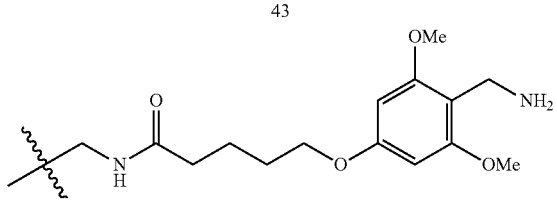

44

-continued

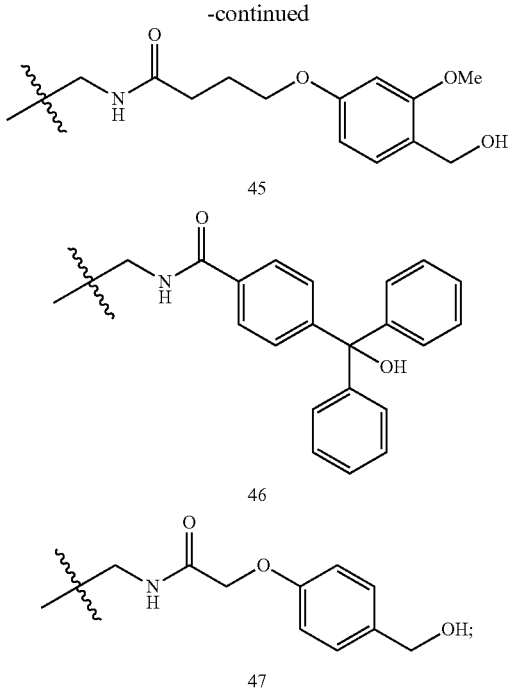

or (d) one of the following structures (52), (53), (54), (55) or (56)

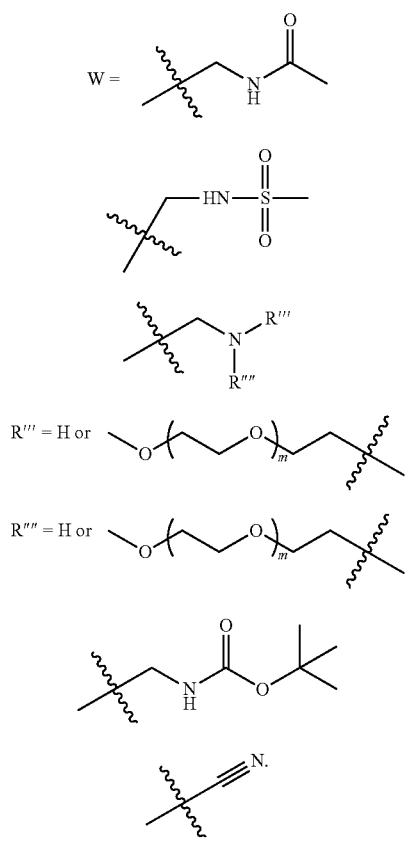

7. A method as defined in claim 6, wherein Z is —CH$_2$CH$_2$—, —CH(CH$_3$)CH$_2$—, —CH$_2$CH$_2$CH$_2$CH$_2$—, or a mixture thereof.

8. A method as defined in claim 1, wherein the solid support comprising a polyalkyl glycol-based cross-linked polyether polymer has been modified by one or more of: (1) inactivating primary amine groups of the polyalkyl glycol-based cross-linked polyether polymer by the formation of amides, carbamates, ureas, sulfonamides, phosphinamides, phosphoramides, sulfenamides, or imines; (2) converting primary amine groups of the polyalkyl glycol-based cross-linked polyether polymer to other functional groups including secondary amine, tertiary amine, nitro, hydroxy, hydrocarbon, ether, halide, nitrile, ester, or acid; (3) preparing the polyalkyl glycol-based cross-linked polyether polymer in a manner that renders the polyalkyl glycol-based cross-linked polyether polymer devoid of amino groups; or (4) adding polyalkyl glycol groups of various lengths to primary amine groups of the polyalkyl glycol-based cross-linked polyether polymer.

9. A method as defined in claim 1, wherein the solid support does not comprise polystyrene.

10. A method as defined in claim 1, wherein the Tc-99m is obtained by neutron capture of Mo-98, by irradiation of highly enriched uranium (HEU) or low enriched uranium (LEU), by a proton-induced process using a linear accelerator to bombard a natural or enriched molybdenum target comprising Mo-100, by using a medical cyclotron to bombard a natural or enriched molybdenum target comprising Mo-100, by a deuteron-induced process using a linear accelerator or a cyclotron to bombard a natural or enriched molybdenum target comprising Mo-100, or by accelerator-based photon or electron-photon induced production of Mo-99.

11. A method as defined in claim 1, wherein the one or more contaminants comprise molybdenum-98 (Mo-98), molybdenum-99 (Mo-99), or molybdenum-100 (Mo-100).

12. A method as defined in claim 11, wherein the conditions favouring interaction of the technetium-99m (Tc-99m) with the solid support comprise basic conditions, wherein the basic conditions comprise a pH of about 8 or higher, or wherein the conditions promoting release of the technetium-99m (Tc-99m) from the solid support comprise neutral or acidic conditions, wherein the neutral or acidic conditions comprise a pH of about 7 or lower.

13. A method as defined in claim 1, wherein the conditions favouring interaction of the technetium-99m (Tc-99m) with the solid support comprise the presence of a sufficient amount of an ammonium or alkali metal cation and one or more of the following anions: hydroxide, fluoride, carbonate, silicate, sulphate, phosphate, dihydrogen phosphate, hydrogen phosphate, formate, succinate, tartrate, citrate, chromate, molybdate, tungstate, orthovanadate, thiocyanate, thiosulfate, fluorosilicate, orthosilicate, hydroxyethane-1,1-diphosphonate, or vinylidene-1,1-diphosphonate, wherein the concentration of the anion is about 0.05 molar or higher, and wherein the conditions promoting release of the technetium-99m (Tc-99m) from the solid support comprise a reduction in the concentration of the anion.

14. A method as defined in claim 1, wherein the solution eluted from the solid support is passed through a strong cation exchange resin.

15. A method as defined in claim 14, wherein the solution eluted from the solid support is passed through an alumina cartridge after the solution eluted from the solid support has been passed through the strong cation exchange resin, so that the technetium-99m (Tc-99m) binds to the alumina cartridge and is subsequently eluted with a saline solution.

16. A method of preparing a solid support useful for the separation of technetium-99m (Tc-99m) from one or more contaminants including molybdenum (Mo), the method comprising reacting a solid support having the structure (1)

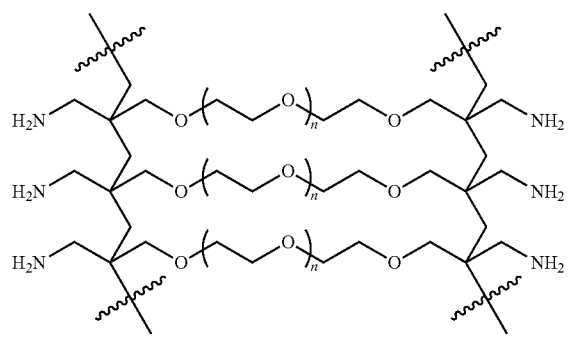

1 wherein n is an integer between 1 and 1000, with:
(a) acetic anhydride and N,N-diisopropylethylamine in methylene chloride to produce a solid support having the general chemical structure (2)

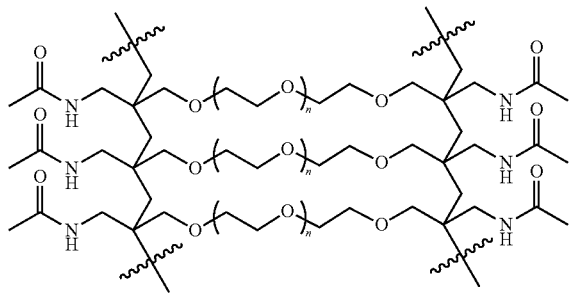

2

(b) methanesulfonyl chloride and N,N-diisopropylethylamine in methylene chloride to produce a solid support having the general chemical structure (3)

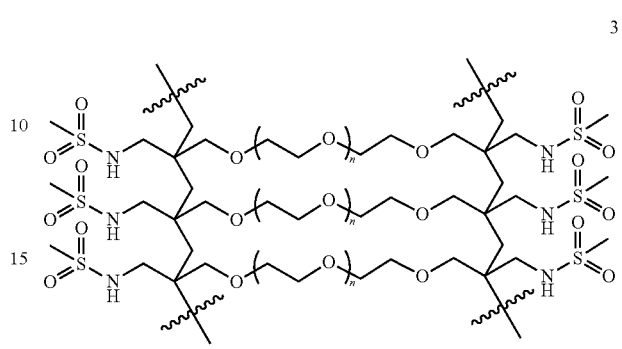

3

(c) poly(ethylene glycol) methyl ether tosylate and potassium carbonate in acetonitrile to produce a solid support having the general chemical structure (4) wherein m is an integer between 1 and 1000

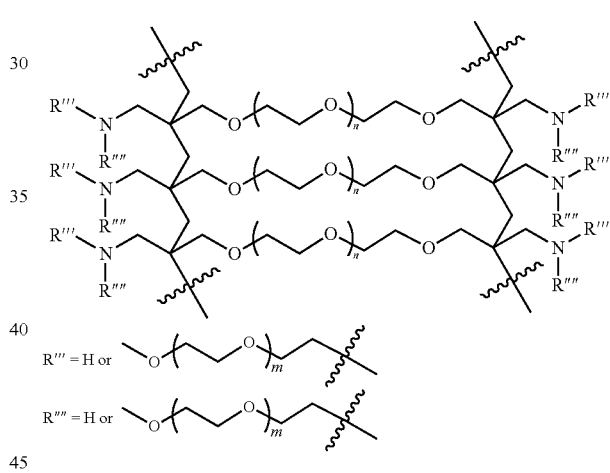

4 or (d) di-tert-butyl dicarbonate and N,N-diisopropylethylamine in methanol to produce a solid support having the general chemical structure (5)

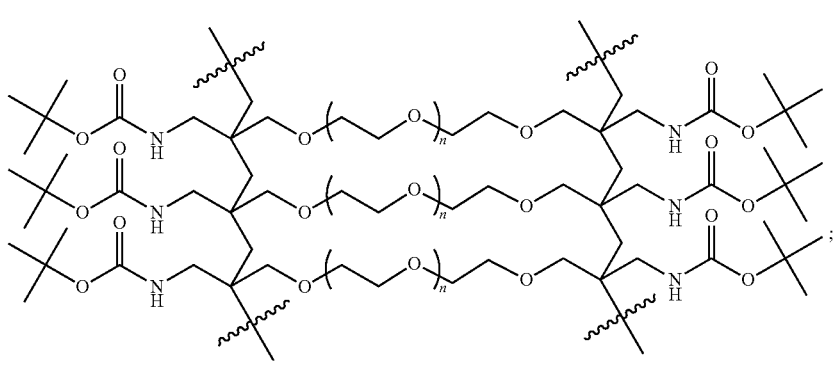

5 or, the method comprising reacting a solid support having the general structure below wherein Z is an alkyl group

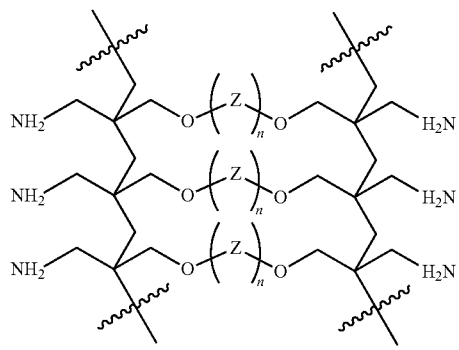

with:

(a) acetic anhydride and N,N-diisopropylethylamine in methylene chloride to produce a solid support having the general chemical structure (52)

52

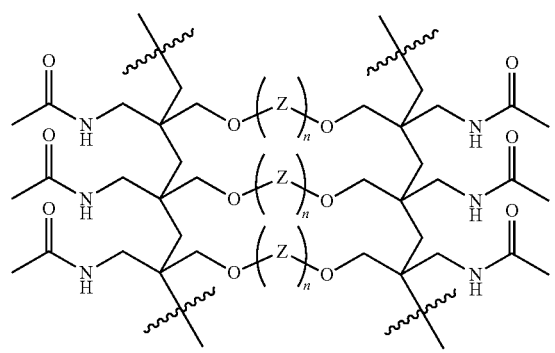

(b) methanesulfonyl chloride and N,N-diisopropylethylamine in methylene chloride to produce a solid support having the general chemical structure (53)

53

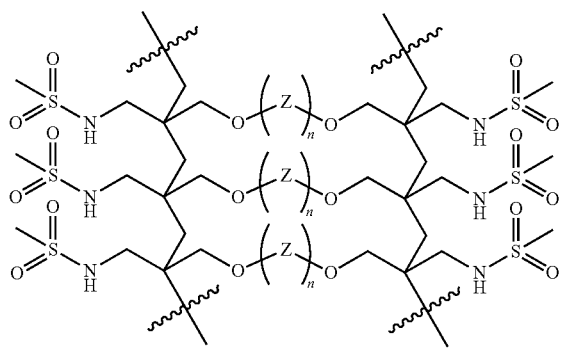

(c) poly(ethylene glycol) methyl ether tosylate and potassium carbonate in acetonitrile to produce a solid support having the general chemical structure (54) wherein m is an integer between 1 and 1000

54

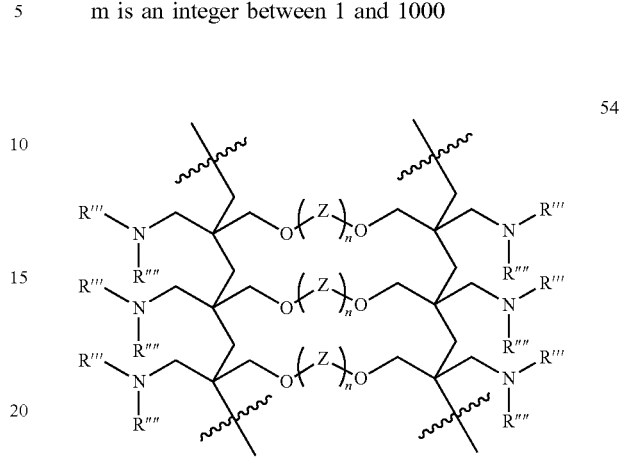

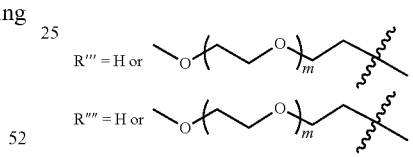

or (d) di-tert-butyl dicarbonate and N,N-diisopropylethylamine in methanol to produce a solid support having the general chemical structure (55)

55

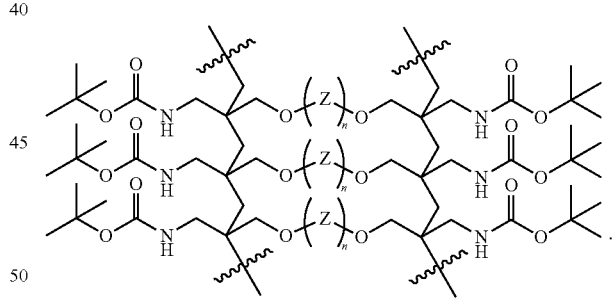

17. A method as defined in claim 16, wherein Z is —$CH_2CH_2$—, —$CH(CH_3)CH_2$—, —$CH_2CH_2CH_2CH_2$—, or a mixture thereof.

18. A method for separating Technetium-99m (Tc-99m) from one or more contaminants including molybdenum (Mo), the method comprising using a solid support consisting of the general chemical structure (2), (3), (4), or (5) below, wherein n is an integer between 1 and 1000 and wherein in is an integer between 1 and 1000:

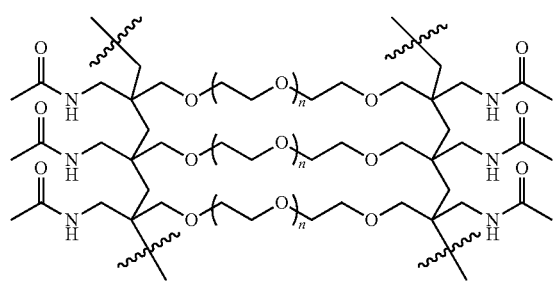
2
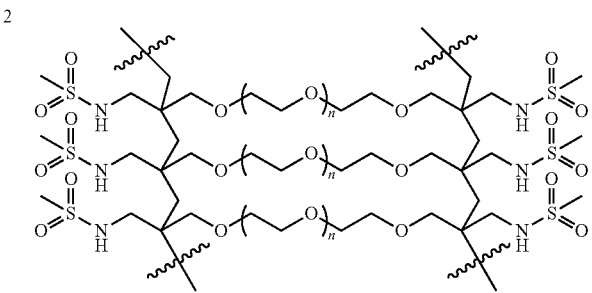
3
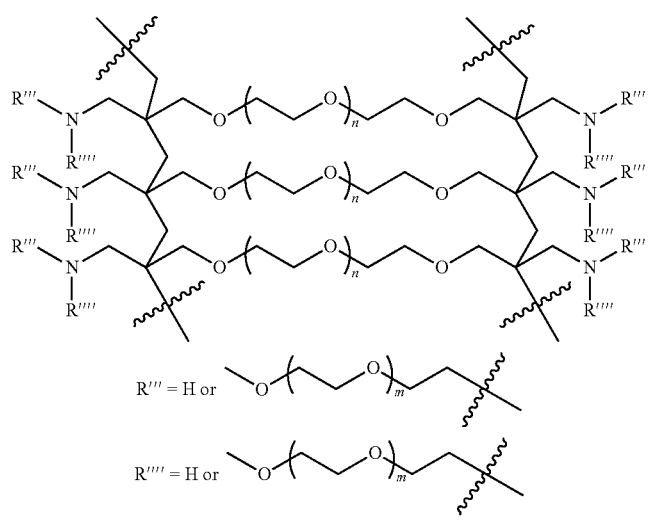
4
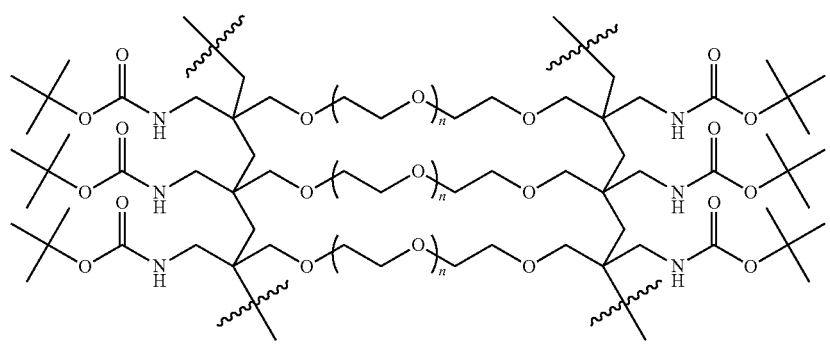
5
or having the general chemical structure (52), (53), (54), or (55) below, wherein m is an integer between 1 and 1000, and wherein Z comprises an alkyl group
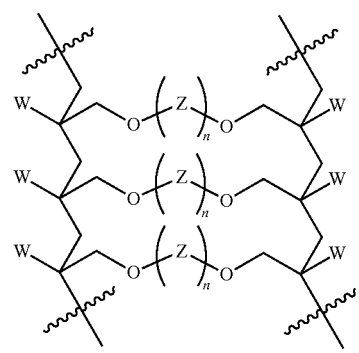
-continued
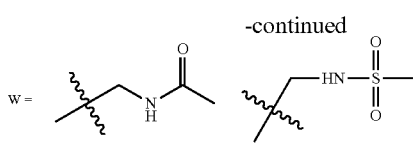
52     53
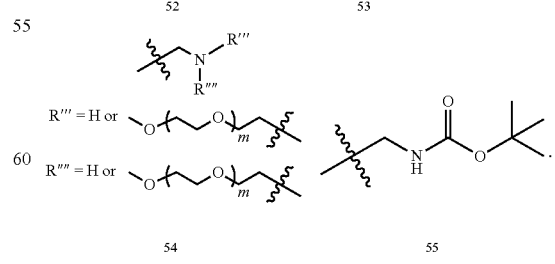
54     55
* * * * *

UNITED STATES PATENT AND TRADEMARK OFFICE
CERTIFICATE OF CORRECTION

PATENT NO. : 9,865,367 B2  
APPLICATION NO. : 14/654363  
DATED : January 9, 2018  
INVENTOR(S) : Francois Benard et al.

Page 1 of 1

It is certified that error appears in the above-identified patent and that said Letters Patent is hereby corrected as shown below:

On the Title Page

Item (71), should be corrected as follows:  
The Governors of The University of Alberta, The University of British Columbia, Carleton University, Simon Fraser University, The Governing Council of The University of Toronto and The University of Victoria, collectively carrying on business as TRIUMF, Vancouver (CA)

Signed and Sealed this  
Fifth Day of June, 2018

Andrei Iancu  
*Director of the United States Patent and Trademark Office*